United States Patent
Nishimura

(10) Patent No.: US 7,149,757 B2
(45) Date of Patent: Dec. 12, 2006

(54) INFORMATION PROCESSING APPARATUS, METHOD OF CONTROLLING INFORMATION PROCESSING APPARATUS, CONTROL PROGRAM FOR INFORMATION PROCESSING APPARATUS AND RECORDING MEDIUM HAVING CONTROL PROGRAM RECORDED THEREON FOR INFORMATION PROCESSING APPARATUS

(75) Inventor: Hajime Nishimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 471 days.

(21) Appl. No.: 10/419,417

(22) Filed: Apr. 21, 2003

(65) Prior Publication Data

US 2004/0019597 A1    Jan. 29, 2004

(30) Foreign Application Priority Data

Apr. 22, 2002   (JP)  ............................. 2002-119267

(51) Int. Cl.
*G06F 17/30* (2006.01)

(52) U.S. Cl. ....................... 707/104.1; 386/21; 386/27; 386/33; 386/35

(58) Field of Classification Search .............. 707/104.1
See application file for complete search history.

(56) References Cited

U.S. PATENT DOCUMENTS

| | | | | |
|---|---|---|---|---|
| 5,617,117 A * | 4/1997 | Kataoka et al. ............. | 345/157 |
| 5,786,858 A * | 7/1998 | Yagasaki et al. ........ | 375/240.15 |
| 5,809,206 A * | 9/1998 | Seki ............................ | 386/116 |
| 5,847,767 A * | 12/1998 | Ueda ........................ | 348/423.1 |
| 6,094,456 A * | 7/2000 | Ueda ...................... | 375/240.12 |
| 6,236,663 B1 * | 5/2001 | Kawakami .................. | 370/470 |
| 6,332,058 B1 * | 12/2001 | Kawakami .................. | 386/111 |
| 6,356,706 B1 * | 3/2002 | Ando et al. .................. | 386/95 |
| 6,643,453 B1 * | 11/2003 | Arai et al. .................. | 386/109 |
| 6,734,877 B1 * | 5/2004 | Kondo et al. ............... | 715/721 |
| 2001/0055467 A1 * | 12/2001 | Nakatani et al. .............. | 386/46 |
| 2002/0141739 A1 * | 10/2002 | Takahashi ................... | 386/111 |

* cited by examiner

*Primary Examiner*—Jean M. Corrielus
(74) *Attorney, Agent, or Firm*—Frommer Lawrence & Haug LLP; William S. Frommer; Thomas F. Presson

(57) ABSTRACT

An information processing apparatus, a method of controlling the information processing apparatus, a control program for the information processing apparatus and a recording medium having the control program recorded thereon for the information processing apparatus, which may be applicable to a hard disk apparatus for recording video data and the like and providing special reproduction of video data recorded by data-compression, while maintaining compatibility with computers. In a FAT file system, a moving image file management table is formed so as to specify a boundary or limit of each unit of encoding and to utilize the moving image file management table for reproducing moving image files.

36 Claims, 25 Drawing Sheets

FIG.21
PRIOR ART

| 8 BYTES | 3 BYTES | 1 BYTES | 10 BYTES | 2 BYTES | 2 BYTES | 2 BYTES | 4 BYTES |
|---------|---------|---------|----------|---------|---------|---------|---------|
| NAME | EXTENSION | ATTRIBUTE | RESERVATION | RECORDED TIME | RECORDED DATE | TOP CLUSTER NUMBER | FILE LENGTH |

FIG.22
PRIOR ART

| VALUE OF FAT (HEXADECIMAL NOTATION) | SEMANTICS |
|---|---|
| 0000h | CORRESPONDING CLUSTER IS IN "FREE" STATE |
| 0002h~FFF6h | CORRESPONDING CLUSTER IS IN "ALLOCATED" STATE CORRESPONDING VALUE IS SUBSEQUENT CLUSTER NUMBER |
| FFF7h | INDICATING DAMAGED CLUSTER |
| FFF8h~FFFFh | CORRESPONDING CLUSTER IS IN "ALLOCATED" STATE INDICATING FILE END (EOF) |

INFORMATION PROCESSING APPARATUS, METHOD OF CONTROLLING INFORMATION PROCESSING APPARATUS, CONTROL PROGRAM FOR INFORMATION PROCESSING APPARATUS AND RECORDING MEDIUM HAVING CONTROL PROGRAM RECORDED THEREON FOR INFORMATION PROCESSING APPARATUS

CROSS REFERENCE TO RELATED APPLICATIONS

The present document is based on Japanese Priority Application JP2002-119267, filed in the Japanese Patent Office on Apr. 22, 2002, the contents of which are incorporated herein by reference to the extent permitted by law.

BACKGROUND OF THE INVENTION

1. Field of the Invention

The present invention relates to an information processing apparatus, a method of controlling the information processing apparatus, a control program for the information processing apparatus and a recording medium having the control program recorded thereon for the information processing apparatus, which may be applicable to a hard disk apparatus for recording video data, for example. The present invention aims at preparing a moving image file management table in a FAT (File Allocation Table) file system to specify a limit of a unit of encoding, to utilize the moving image file management table to reproduce moving image files, and to reproduce the video data recorded by data-compression, while maintaining compatibility with the computer.

2. Description of Related Art

Random-access is possible in a conventional hard disk drive used as a peripheral apparatus of a personal computer and nowadays the hard disk drives have been downsized and improved so as to have increasingly higher recording density. As a result, the hard disk drive is applied to recording of audio data or video data (hereafter referred to as AV data) so that a variety of applications in home servers, in-vehicle apparatuses, etc. have been proposed.

In such a hard disk drive, data recorded on the hard disk may be managed by each unit of cluster having a plurality of sectors (i.e. on a cluster by cluster basis) by means of a file allocation table (FAT) which constitutes management data recorded on the hard disk, and the management is carried out by a personal computer etc. which constitutes a host apparatus. A file managing system by the file allocation table is hereafter referred to as a FAT file system.

SUMMARY OF THE INVENTION

Specifically, FIG. 19 is a block diagram showing a conventional hard disk drive. The hard disk drive 1 is connected to the host apparatus 2 from which a variety of data are output to be recorded on the hard disk 3. The host apparatus 2 is a computer, for example.

The hard disk 3 employs a format of MS-DOS compatible file system as shown in FIG. 20. In other words, an information recording surface of the hard disk 3 is divided into an inner periphery area and an outer periphery area, and the outer periphery area is allocated to a system entry area. The inner periphery area is allocated to a data area. Among these, the data area is further divided into clusters on each of which user data are recorded by the unit of data of a predetermined number of frames.

Further, the information recording surface of the hard disk 3 is concentrically divided into a plurality of zones. A track in each zone is circumferentially divided into a plurality of sectors with a predetermined length. As for thus-sectored hard disk 3, physical addresses are set with respect to a surface number of the information recording surface, track numbers successively allocated from the outer periphery of the information recording surface, sector numbers for specifying sectors in each track. The user data are managed in files by means of logical addresses which are set in order from the outer periphery of the information recording surface corresponding to the physical addresses.

The logical addresses are represented by cluster numbers. A cluster is a unit representing a group of plural logic sectors. In other words, a logical sector is an area corresponding to a unit of recording of data where a starting area (a outermost periphery or end, in this case) on an information recording surface is set to sector 0. For example, one physical sector corresponds to one logical sector, and a logical sector number is represented by the following relational expression:

$$\text{Logical Sector Number} = \text{Number of Sectors per Track} \times (\text{Surface Number} + \text{Nunber of Surfaces} \times \text{Track Number}) + \text{Sector Number} - 1$$

where, the Surface Number, the Track Number, and the Sector Number are of physical address.

The logical sectors are configured to have 512 byte data (when converted into the user data) to be recorded on one logical sector. A plurality of logical sectors constitute one cluster. One cluster comprised of a certain number, generally a power of two, of sectors is specified as a cluster number which is one of serial numbers starting with 2 at the beginning of a file area in the data area having the user data recorded thereon.

The data area has the thus arranged clusters respectively allocated with cluster numbers, and the data area may be accessed cluster by cluster with reference to the cluster numbers. In this case, the cluster numbers are represented in four digit hexadecimal notation. Thus, the minimum unit of one file is one cluster.

On the other hand, the system entry area is further divided into a boot area, a FAT (File Allocation Table) area, and a directory area. In the boot area, data for defining disk structure are recorded. On the other hand, in the FAT area and the directory area the management data are recorded according to address information, for example, necessary for accessing to the user data recorded in the data area.

In other words, file management data for specifying a file recorded on the data area is recorded in the directory area. On the other hand, in the FAT area, linked to the file management data, a management table having an address of a unit of management recorded thereon in which subsequent data are recorded is recorded for each cluster which is the unit of management of the data area. In particular, a cluster number of each cluster subsequent to a head cluster of each file is recorded in the FAT area, for example. Thus, after detecting a top cluster number of a desired file name from the directory area, the hard disk 3 successively detects cluster numbers subsequent to the head or top cluster number from the FAT area so as to detect addresses of sequential clusters constituting one file.

As a result, in FIG. 20, when a file 1 is recorded in clusters having cluster numbers 1234h through 1240h in the data area, a code indicating the cluster number 1234h of the first cluster of the file 1 is recorded in the directory area, and cluster numbers subsequent to the cluster number 1234h are successively recorded in corresponding areas of the FAT area. It should be noted that EOF (End Of File) as shown in FIG. 20 is identification information to indicate the last cluster in one file.

In particular, for each file recorded in the data area, file management data for specifying each file recorded in the data area is recorded in the directory area according to a conventional data structure as shown in FIG. 21. In other words, as for the file management data, the top eight bytes are allocated with the file name, three bytes subsequent to the top eight bytes are allocated with an extension. Further one byte subsequent to the three bytes is allocated with data indicating a file attribute, ten bytes are subsequently allocated with data for reservation. Then, two bytes subsequent to the ten bytes are allocated with data for start time of recording, further two bytes are subsequently allocated with data of recording date, and still further two bytes are allocated with the cluster number of the top cluster number. The last four bytes are allocated with data of a file length.

On the other hand, in the FAT area (as shown in FIG. 20), identification data indicating relationships among clusters are recorded, each cluster being the unit of management of the data area. In other words, the FAT area is such that cluster addresses are allocated corresponding to the cluster numbers in the data area, and a cluster number of a cluster subsequent to each cluster address is recorded. As shown in FIG. 21, among codes which are not allocated to the cluster numbers, predetermined codes are allocated to a free space, a damaged cluster, and identification information indicating EOF.

As a result the hard disk 3 may access the FAT area so as to detect the free space of the data area. According to the damaged sector, an alternative process may be carried out. Further, when recording, the damaged sector may be registered by means of a retry process of "write and verify". Thus, the hard disk 3 may manage the information recording surface by a predetermined unit of block, or on a predetermined block-by-block basis.

A servo circuit 4 drives a motor (M) 6 by controlling a hard disk control circuit 5 to thereby rotate the hard disk 3 at a predetermined rotational speed. In a similar manner, the servo circuit 4 drives a motor (M) 8 so as to cause a magnetic head to perform seeking operation and controls tracking. As for a drive for a hard disk such as the hard disk 3, a CAV (Constant Angular Velocity) system is typical. Recently a so-called zone bit recording method is employed, wherein a track on the outer periphery is provided to have more sectors per circumference or cycle and recording frequency is rendered variable so that data are efficiently recorded to increase a recording capacity.

By control of the hard disk control circuit 5, when recording, a read/write data channel unit 9 encodes output data of the hard disk control circuit 5 by a system suitable for characteristics of recording/reproducing system in order to generate data of a bit sequence, thereby driving the magnetic head according to the data. When reading, the read/write data channel unit 9 processes a reproduction signal obtained from the magnetic head so as to generate reproduction data which is outputted to the hard disk control circuit 5.

The hard disk control circuit 5 is a control circuit for managing data on the hard disk 3 according to instructions from an interface control circuit 7, controls an operation of the servo circuit 4 according to the user data inputted via a buffer memory 10, and outputs the user data to the read/write data channel unit 9 so as to successively record data in clusters designated via the interface control circuit 7. When reading, operations of the servo circuit 4 are controlled in a similar manner so as to output outputted data from the read/write data channel unit 9 to the buffer memory 10, thereby reproducing clusters designated through the interface control circuit 7.

The interface control circuit (IF control) 7 may be formed of a SCSI (Small Computer System Interface) controller, an IDE (Intelligent Drive Electronics) controller, etc., for example, and constitute an input/output circuit for communicating data, control commands, etc. with the host apparatus 2. In other words, the interface control circuit 7 analyzes a command inputted from the host apparatus 2 and a parameter set in the command so as to control operations of the hard disk control circuit 5 etc. When writing, data inputted from the host apparatus 2 are outputted to the hard disk control circuit 5 via the buffer memory 10. When reading, data outputted from the hard disk control circuit 5 are outputted to the host apparatus 2 via the buffer memory 10.

Accordingly, in the host apparatus 2 a central processing unit (CPU) 12 which has reserved a work area in the system memory 11 carries out a process so as to transmit a variety of commands etc. to the hard disk drive 1 according to instructions from a user.

In the process the central processing unit 12, when switching on a power supply, carries out a predetermined procedure and issues a command to the hard disk drive 1 so as to reproduce the management data recorded in the system entry area of the hard disk 3. Consequently, the hard disk drive 1 outputs data in the system entry area (data in the FAT area, the directory area) so as to be recorded in the system memory 11. Thus, the central processing unit 12 obtains the management data recorded in the hard disk 3, sets a parameter based on the management data, and outputs a variety of commands to the hard disk drive 1.

In other words, when the user issues instructions to record the data, the central processing unit 12 detects a free space by successively tracing the data in the FAT area recorded in the system memory 11 so as to set a parameter to utilize clusters in the free space for recording and issue a write command. Corresponding to the write command, the hard disk drive 1 records data inputted successively on the hard disk 3. The central processing unit 12 and the hard disk drive 1 successively trace records of the management data on a predetermined data length by data length basis so as to repeatedly issue such a command and record the data, thereby recording a desired file.

Upon completion of recording the file in this way, the record in the system memory 11 is updated corresponding to the record in the file. At a predetermined timing, corresponding to the record in the system memory 11, the hard disk drive 1 is provided with instructions to update the system entry area, whereby the file thus recorded is reproduced again.

Now, FIG. 23 is a flow chart showing a conventional procedure when recording in this type of recording/reproducing system. When executing the procedure, the central processing unit 12 in the host apparatus 2 moves from step SP1 to step SP2 and searches the management data recorded in the system memory 11 which is a host memory so as to detect a cluster number (a free cluster address) to which a code indicating a free space area is set.

Upon detection of the free cluster address in this way, the central processing unit 12 sets a parameter with respect to the free cluster address and a transfer length, issues a write command in subsequent step SP3, then, in the subsequent step SP4, transmits data to be provided for recording to the hard disk drive 1 by the transfer length. In subsequent step SP5, the hard disk drive 1 records data transmitted corresponding to the write command in the buffer memory 10, then, in subsequent step SP6, successively records the data recorded in the buffer memory 10 in free clusters designated by the host apparatus 2.

Upon completion of recording the data transmitted from the host apparatus 2 in this way, the hard disk drive 1 interrupts the host apparatus 2 in step SP7. Because of the interruption the host apparatus 2 moves to step SP8 so as to determine whether or not transferring the data provided for recording has been completed, and returns to step SP2, if a negative result is obtained. Thus, the host apparatus 2 detects a free space and issues of a write command repeatedly for a file of large amount of data. Corresponding to the command, the hard disk drive 1 successively records data in free clusters designated by the host apparatus 2.

On the other hand, upon completion of transferring the data provided for recording, a positive result is obtained in step SP8. Then, the host apparatus 2 moves to step SP9, updates contents in the system entry area recorded in the host memory 11 so as to correspond to the records in the file, instructs the hard disk drive 1 to update the system entry area in order to correspond to the update of the contents, then moves to step SP10 so as to terminate the procedure.

On the other hand, FIG. 24 is a flow chart showing a conventional read process based on the management data recorded on the system memory 11 in the host apparatus 2 with respect to thus recorded user data. The central processing unit 12 in the host apparatus 2 moves from step SP11 to step SP12, searches the management data recorded in the host memory 11 for detecting a top cluster number of a file to be read from the data in the directory area.

Detecting the top cluster number, the central processing unit 12 moves to step SP 13, sets a parameter with respect to the top cluster address and a transfer length, and issues a write command.

When the host apparatus 2 issues the write command in this way, the hard disk drive 1 reads data designated by the command from the hard disk 3 in subsequent step SP14. In subsequent step SP15, the read data are temporarily stored in the buffer memory 10. Upon completion of the reading, the host apparatus 2 is interrupted in subsequent step SP16. Because of the interruption, the central processing unit 12 in the host apparatus 2 moves to step SP17 and instructs the hard disk drive 1 to transfer the data. Due to the instructions, in the hard disk drive 1, the temporarily recorded user data in the buffer memory 10 are outputted to the host apparatus 2.

When inputting the user data corresponding to one read command in this way, then in subsequent step SP18 the host apparatus 2 searches the host memory 11 for detecting an address of subsequent cluster based on a linked cluster number from the data in the FAT area. Further, in subsequent step SP19 the host apparatus 2 determines whether or not a code based on the thus detected address is an EOF.

When a negative result is obtained, the host apparatus 2 returns to step SP13, and again sets a parameter with respect to the address detected in step SP18 so as to issue a write command. Thus, for a file of large amount of data, the host apparatus 2 detects successive cluster numbers and repeatedly issues the write command. Corresponding to the command, the hard disk drive 1 successively reproduces the user data from clusters designated by the host apparatus 2.

On the other hand, when an EOF is detected from the data in the FAT area, a positive result is obtained in step SP19 so that the central processing unit 12 moves to step SP20. Then, the central processing unit 12 sets a parameter and issues a write command for the rest of the user data up to the cluster where the EOF is set.

When the host apparatus 2 issues the read command in this way, then in subsequent step SP21 the hard disk drive 1 reads the data designated by the command from the hard disk 3. In subsequent step SP22, the read data are temporarily stored in the buffer memory 10. Upon completion of the reading, the host apparatus 2 is interrupted in subsequent step SP23. Because of the interruption, the host apparatus 2 moves to step SP24 and instructs the hard disk drive 1 to transfer the data. Due to the instructions, the hard disk drive 1 outputs the temporarily recorded user data in the buffer memory 10 to the host apparatus 2, then moves to step SP25 so as to terminate the procedure.

In a DVD (Digital Video Disk) player which is an optical disk apparatus, a disk-shaped recording medium, apparatus similar to such a hard disk apparatus, moving image file data are compressed based on the MPEG (Moving Picture Experts Group) standard so as to be recorded, and file management which employs GOP (Group Of Pictures) as the minimum unit provides special reproduction such as high speed reproduction.

FIG. 25 is a chart indicating a conventional file structure according to the MPEG standard in which a synchronization header (SH) is disposed at the head of each GOP. For example, video data of 0.5 second are allocated to three GOP's. Each GOP is provided with an I-picture at its top or head, followed by B-pictures and P-pictures in a predetermined order.

As a result the DVD player reproduces and decodes video data from the DVD in a reverse direction along a time axis by units of GOP, i.e., on a GOP by GOP basis, and the decoded video data are successively outputted in the reverse direction along the time axis, thereby realizing the special reproduction by means of a reverse reproduction corresponding to a reverse playback as in a video tape recorder. When only the data of the I-pictures which are the head of respective GOP's are reproduced and decoded, special reproduction of fast-forward reproduction corresponding to a fast-forward playback as in the video tape recorder may be realized. Further, when the order of GOP's is set to the reverse direction along the time axis, special reproduction of fast-reverse reproduction may be realized.

The FAT file system applied to a hard disk apparatus has high compatibility with a computer, therefore has been widely applied to an optical disk apparatus, a solid-state memory which constitutes a highly downsized storage, etc.

However, the FAT file system presents a drawback in which it is difficult to realize for a special type of reproduction as in the DVD player.

In other words, in the FAT file system, for each recording area of an information recording surface, the recording area being a unit of recording the data, an address having subsequent data recorded therein is recorded to form a FAT. Data of the FAT are successively traced for detecting a cluster address having desired data recorded therein, thereby obtaining the cluster address. Thus, when performing reverse reproduction, the FAT file system needs to search sequential cluster addresses in a direction against an originally assumed order in the FAT file system, that is in a direction from an EOF side to a top cluster address, thereby rendering a search process of cluster addresses very complicated. In particular, for fast reproduction, searching cluster addresses may not follow a data transfer rate. Consequently, video data may not be processed in real time.

Like file management systems for DVD players based on GOP as a unit, since it is difficult to specify a recording starting position for a unit of encoding in the FAT file system, fast reproduction with the DVD player where only I-pictures are selectively reproduced may not be realized. Consequently, all data must be reproduced and pictures must be selectively outputted from the resulting reproduction. As a result, processing may not follow fast-forward or fast-reverse reproduction.

Such a drawback may happen not only in processing compressed data according to the MPEG standard which is a variable length encoding system but also in processing compressed data according to the DV standard which is a fixed length compression system.

One way of solving such a drawback may be to apply a file management system similar to that of the DVD player to the hard disk apparatus for recording video data. However, when the file management system similar to that of the DVD player is applied, compatibility with a computer may not be completed, so that management of text data etc., other than video data may be complicated. Nowadays, it is desirable to use a storage apparatus such as the hard disk apparatus wherein not only a large-sized file such as video data but also a small-sized file such as text data may be efficiently managed by a computer.

In view of the above the present invention has been made and provides a an information processing apparatus, a method of controlling the information processing apparatus, a control program for information processing apparatus and a recording medium having the control program recorded thereon for the information processing apparatus, which may perform special reproduction of video data recorded by means of data-compression while maintaining compatibility with a computer.

According to a preferred embodiment of the present invention, there is provided an information processing apparatus for management of a data area of a recording medium by means of file management data specifying at least a file recorded in the recording medium and by means of a management table associated to the file management data and on which there is recorded an address of a management unit of the data area having data recorded continuously by units of the management unit; the apparatus performs reproduction process of a moving image file recorded in the data area, upon referring to a moving image file management table; and the moving image file management table includes a table having recorded thereon an address of the management unit in order to permitting specifying a limit of an encoding process unit of the moving image file among files recorded in the data area.

According to another preferred embodiment of the present invention, there is provided an method of controlling an information processing apparatus for management of a data area of a recording medium by means of file management data specifying at least a file recorded in the recording medium and by means of a management table associated to the file management data and on which there is recorded an address of a management unit of the data area having data recorded continuously by units of the management unit, the method inlcuding the step of processing a moving image file by reproducing the moving image file recorded in the data area upon referring to a moving image file management table having recorded thereon an address of the management unit in order to permitting specifying a limit of an encoding process unit of the moving image file among files recorded in the data area.

Another preferred embodiment of the present invention provides a controlling program for an information processing apparatus for management of a data area of a recording medium by means of file management data specifying at least a file recorded in the recording medium and by means of a management table associated to the file management data and on which there is recorded an address of a management unit of the data area having data recorded continuously by units of the management unit, the program including the step of processing a moving image file by reproducing the moving image file recorded in the data area upon referring to a moving image file management table having recorded thereon an address of the management unit in order to permitting specifying a limit of an encoding process unit of the moving image file among files recorded in the data area.

Furthermore, according to still another preferred embodiment of the present invention, there is provided a recoding medium containing a controlling program for an information processing apparatus for management of a data area of a recording medium by means of file management data specifying at least a file recorded in the recording medium and by means of a management table associated to the file management data and on which there is recorded an address of a management unit of the data area having data recorded continuously by units of the management unit, the control program including the step of processing a moving image file by reproducing the moving image file recorded in the data area upon referring to a moving image file management table having recorded thereon an address of the management unit in order to permitting specifying a limit of an encoding process unit of the moving image file among files recorded in the data area.

The information processing apparatus according to the preferred embodiment of the present invention is applied for management of a data area of a recording medium by means of file management data specifying at least a file recorded in the recording medium and by means of a management table associated to the file management data and on which there is recorded an address of a management unit of the data area having data recorded continuously by units of the management unit. By doing so, it is possible to maintain compatibility with computers. By performing reproduction process of a moving image file recorded in the data area, upon referring to a moving image file management table and the moving image file management table including a table having recorded thereon an address of the management unit in order to permitting specifying a limit of an encoding process unit of the moving image file among files recorded in the data area, it is possible to perform reproduction by units of the encoding process. As a result, it becomes possible to execute reproduction process on a reverse direction when setting the sequence of the encoding process unit to be reverse in relation to the recording sequence. In addition, it is possible to perform high speed reproduction upon selectively utilizing decoding results of the encoding process unit, thus permitting realizing a special reproduction of video data recorded under data compression.

Accordingly, the preferred embodiments of the present invention described above provide a method of controlling the information processing apparatus, a control program for the information processing apparatus and a recording medium having the control program recorded thereon for the information processing apparatus that enable special reproduction of video recorded by data-compression while maintaining compatibility with computers.

The above may be accomplished by having the moving image file management table formed so as to specify the limit or boundary of each unit of encoding and to utilize the moving image file management table for reproducing moving image files.

BRIEF DESCRIPTION OF THE DRAWINGS

The above and other objects, features and advantages of the present invention will become more apparent to those skilled in the art from the following description of the presently preferred exemplary embodiments of the invention taken in conjunction with the accompanying drawings, in which:

FIG. 21 is a chart showing data to be recorded in a directory area of FIG. 20;

FIG. 22 is a table showing codes to be recorded in an FAT area of FIG. 20;

DESCRIPTION OF PREFERRED EMBODIMENTS OF THE PRESENT INVENTION

With reference to the accompanying drawings, preferred embodiments of the present invention will be described in detail below.

Figure 2:
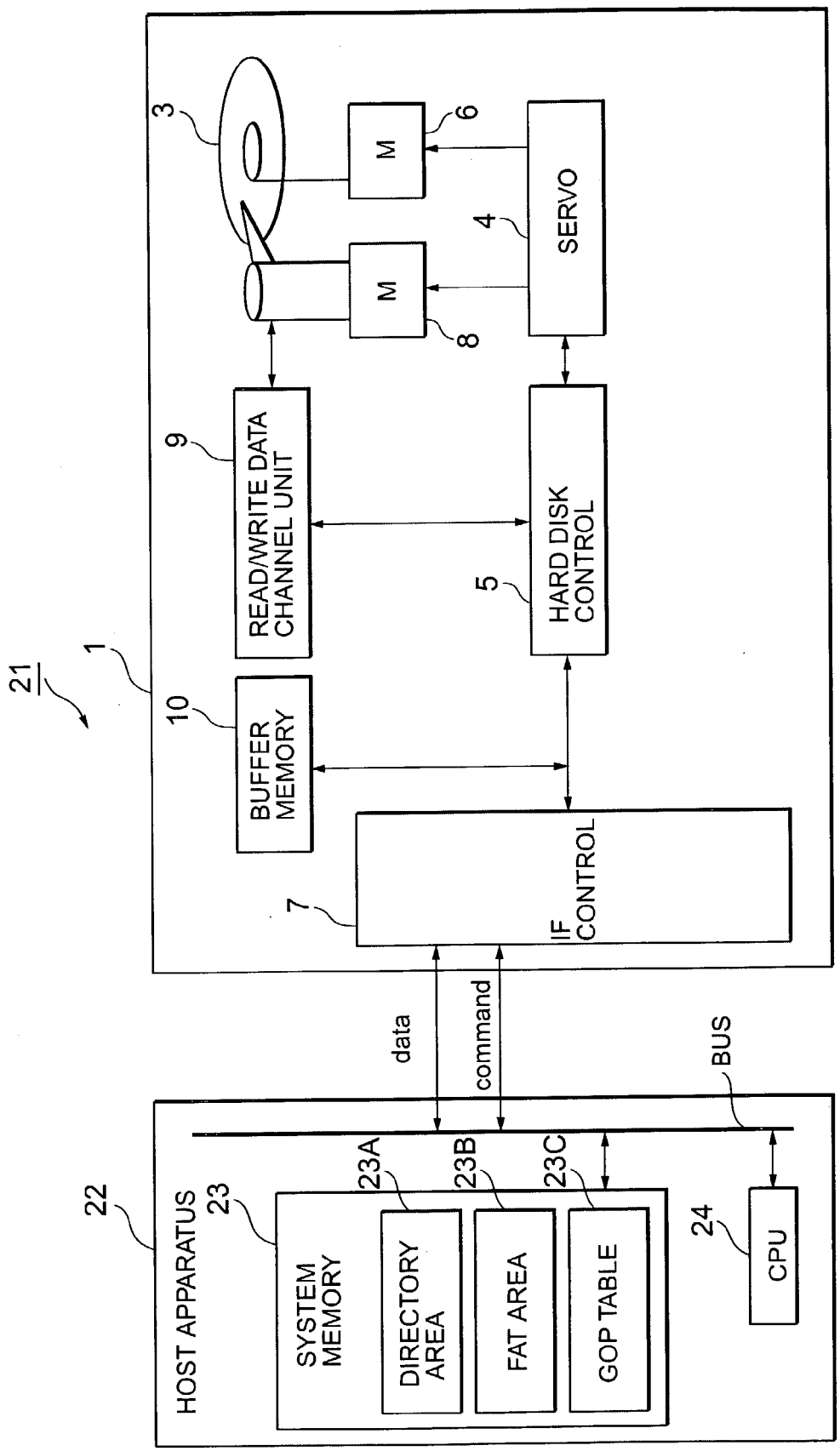
FIG. 2 is a block diagram showing the AV system according to the first embodiment of the present invention.
Figure 19:
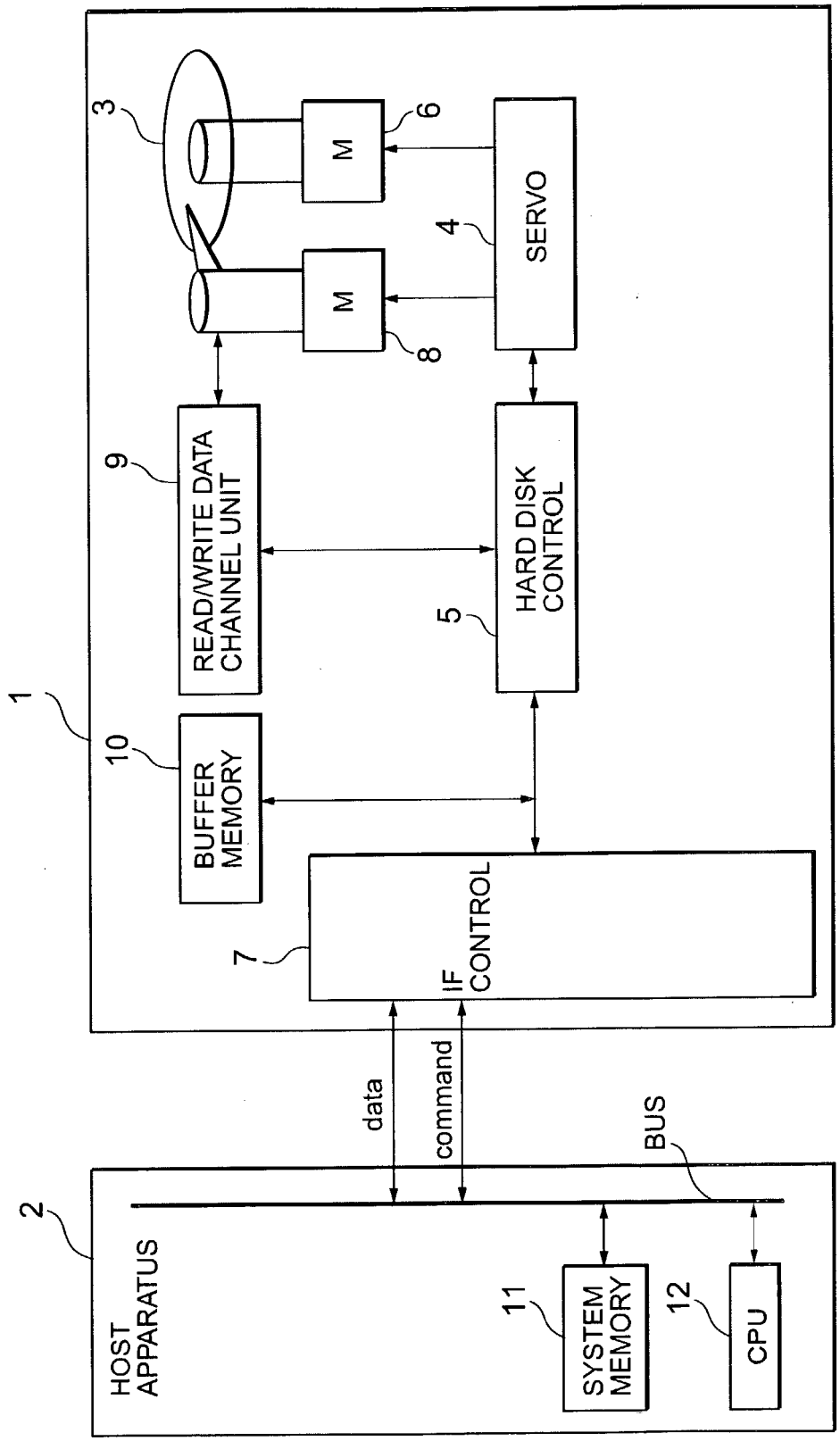
FIG. 19 is a block diagram showing a system employing a conventional hard disk drive.
Figure 20:
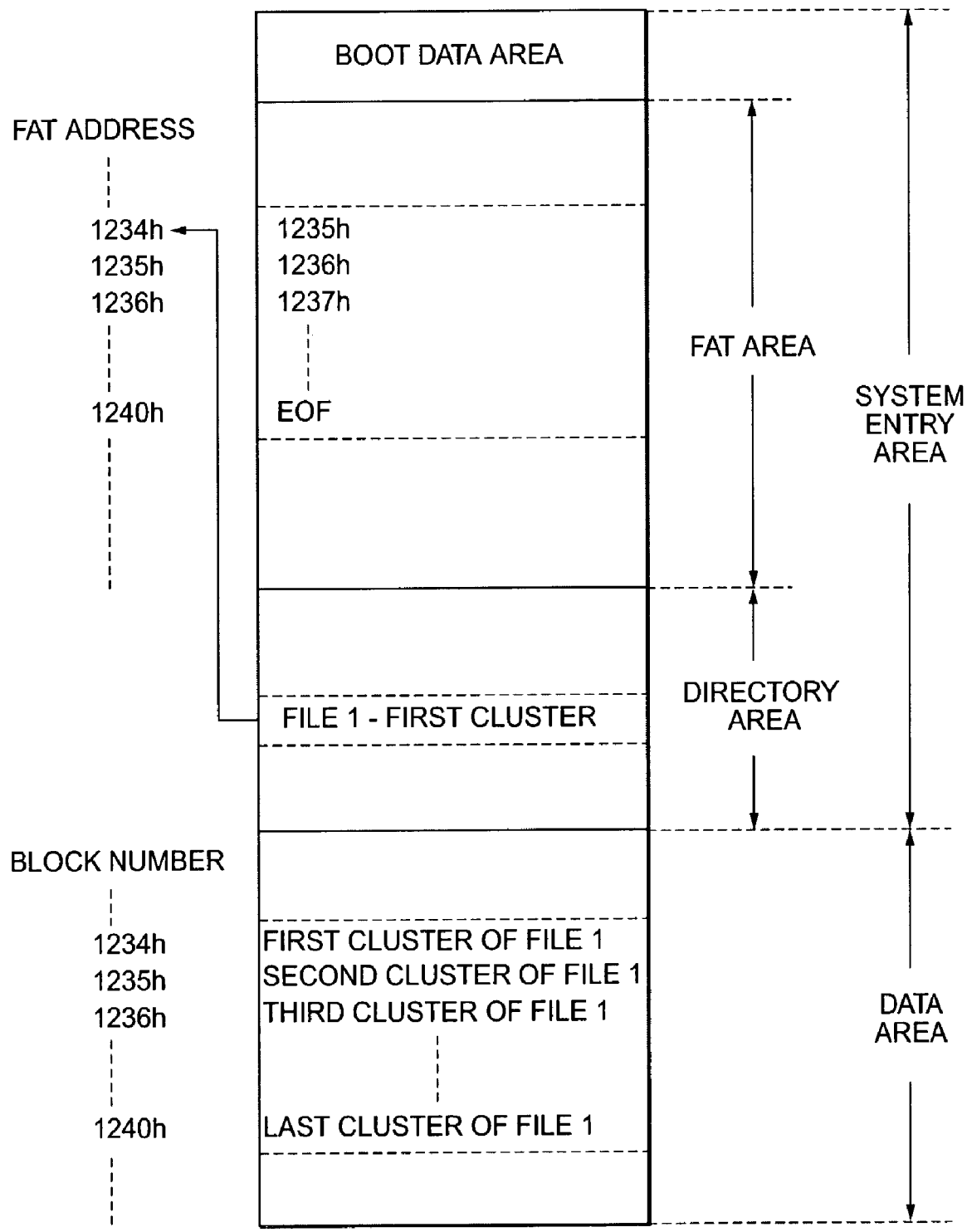
FIG. 20 is a chart showing a recording format in a conventional hard disk.

(1) First Preferred Embodiment of the Present Invention (1-1) Construction of the First Preferred Embodiment of The Present Invention FIG. 2 is a block diagram showing an AV system according to a first preferred embodiment of the present invention. In the AV system 21, the hard disk drive 1 as described above with reference to FIG. 19, for example, and with respect to a FAT (File Allocation Table) file system, is controlled by a host apparatus 22, and video data based on the MPEG format, for example, are recorded/reproduced.

The host apparatus 22 may be constituted by a variety of video apparatuses, and executes a predetermined processing program pre-installed by a central processing unit 24 so as to control the whole operation of the AV system 21.

In the process, when a power supply is started up, the central processing unit 24 obtains data of the directory area and the FAT from the hard disk drive 1, then stores and maintains the data in a system memory 23 in which the central processing unit 24 may construct a directory area 23A and an FAT area 23B recorded in the hard disk 3.

Then, the central processing unit 24 refers to the records in the system memory 23 so as to detect a free space etc. According to the detection result, a parameter is set and written in the hard disk drive 1, and a read command is issued. Further, corresponding to the processes such as read, deletion, etc., contents in the system memory 23 may be updated.

Constructing the directory area 23A and the FAT area 23B in the system memory 23 in this way, the central processing unit 24 then issues a command to the hard disk drive 1 so as to instruct reproduction of a GOP table file with reference to the records in the system memory 23. Further, according to the instructions concerning the reproduction, data of the GOP table are outputted from the hard disk drive 1, then recorded and maintained in the system memory 23. Thus, the central processing unit 24 constructs a GOP table 23C in the system memory 23, similar to the directory area 23A and the FAT area 23B.

On obtaining the instructions concerning special reproduction from the user in this way, the central processing unit 24 searches the GOP table 23C maintained in the system memory 23 as described above, and sets a command based on the search result so as to output a reproduction command, thereby successively obtaining reproduction data concerning the special reproduction. When recording video data, the GOP table is updated corresponding to the records of the video data, thus performing the special reproduction with respect to the file immediately after the recording. After the GOP table recorded in the hard disk 3 is updated with the GOP table maintained in the system memory 23, similarly the records in the hard disk 3 are updated with the data in the directory area and the FAT area maintained in the system memory 23.

Figure 1:
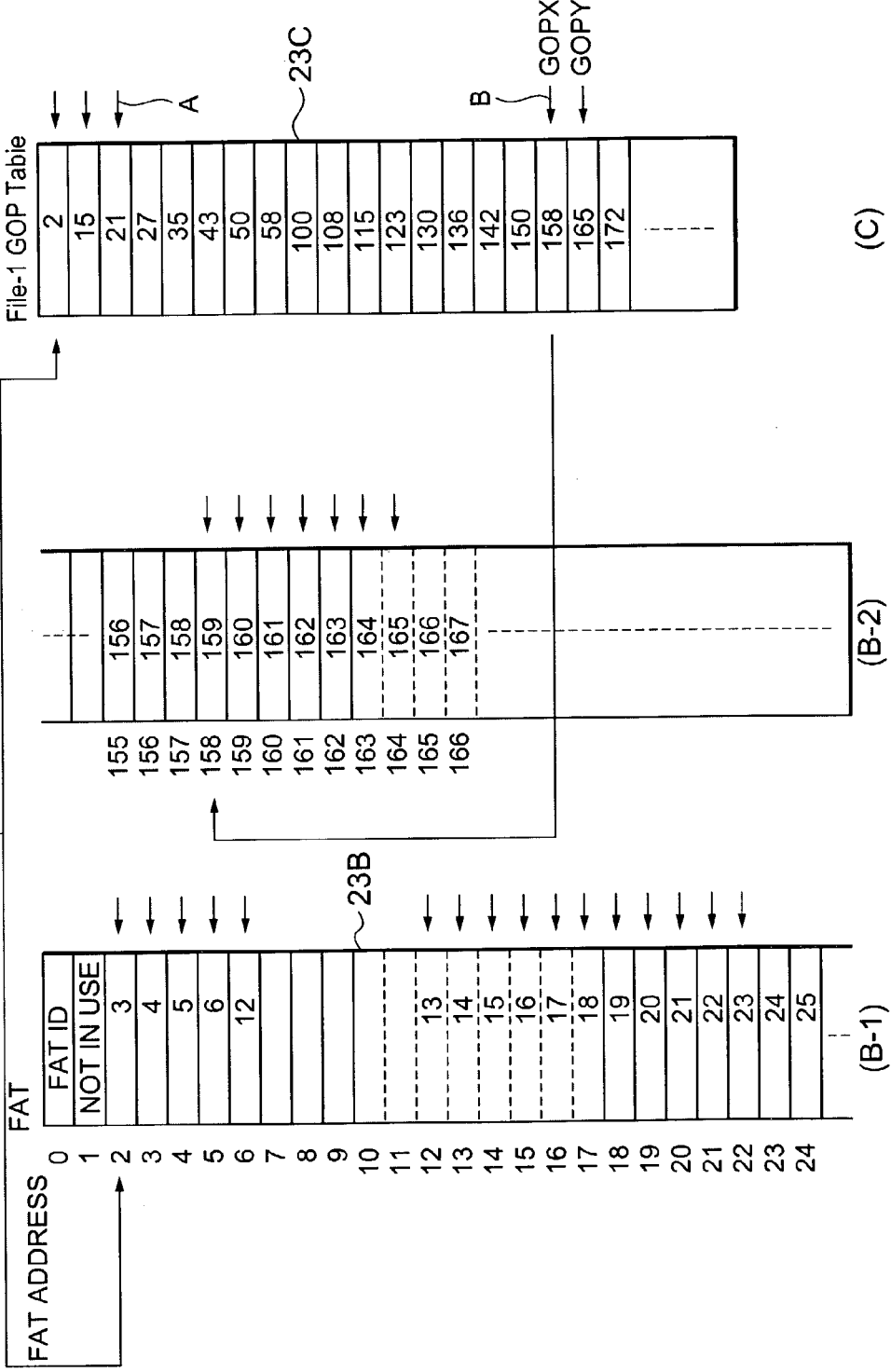
FIG. 1 is a chart provided for explaining a GOP table in an AV system according to the first embodiment of the present invention.

Now, FIG. 1 is a chart provided for explaining relationships among the directory area, the FAT area and the GOP table. The FAT area 23B is formed of cluster addresses on which data are successively recorded for each cluster as a unit of data recording. The directory area 23A is formed of top cluster addresses (top clusters) together with file names etc. recorded thereon for respective files. Thus, in the FAT file system, with respect to a file to be reproduced, a head cluster is detected from the directory area, and the FAT area is successively searched according to the top cluster addresses for successively detecting cluster addresses having a desired file recorded therein.

As a result, in this preferred embodiment of the present invention, file management data for specifying a file recorded in the data area of the hard disk 3 which is at least a recording medium are recorded so as to construct the directory area 23A. Connecting with the file management data, on a cluster by cluster basis (the unit of managing the data area), the FAT area 23B is constituted by the file management table having an address of the unit of managing recorded thereon where subsequent data are recorded, thereby constituting the FAT file system.

The GOP table 23C is a specific table used when reproducing moving images and is formed by recording addresses of the unit of recording so as to be able to specify a limit or boundary of the unit of encoding with respect to moving image files out of recorded files in the data area. In this preferred embodiment of the present invention, as a moving image file constituting the GOP table 23C in this way, a moving image file compressed according to the MPEG standard is set to be a subject, whereby the unit of encoding is set to the GOP. As an address of the unit of managing to be recorded in the GOP table 23C, a cluster address of a recording starting position of an I-picture which is a head of the GOP may be applied.

As a result, the GOP table 23C successively records cluster addresses having the I-picture recorded therein, which is a picture encoded intraframely according to the MPEG standard. In this preferred embodiment of the present invention, in order that the cluster addresses of the I-pictures are in sequence, each video file is recorded on the data area of the hard disk 3 by setting a specific extension so as to distinguish from other files. In the central processing unit 24 of the host apparatus 22, for this reason, when the directory area 23A is constructed in the system memory 23, based on the file management data of the GOP table file recorded in the directory area 23A, the hard disk drive 1 is provided with instructions to reproduce all the GOP tables. When GOP tables are constructed in the system memory 23, by comparing a cluster address recorded at the head of each GOP table with the top cluster address recorded in the file management data of the moving image file, a combination of each moving image file and corresponding GOP table is detected, and the combination or relationship is recorded and maintained in the system memory 23. Thus, in the host apparatus 22, moving image files are processed in one unit of GOP so as to realize a fast special reproduction according to a conventional FAT file system.

In other words, FIG. 1 shows an example of preferred embodiment of the present invention in which files of video data are successively recorded in consecutive clusters having cluster addresses from 0002h (a head cluster address) to 0006h, consecutive clusters having cluster addresses 0012h to 0059h, and consecutive clusters having cluster addresses from 0100h to 0172h and the following. In the case of reproduction at a forward normal speed, pointers are set in the FAT area 23B as indicated by arrows, so that video data are reproduced from the hard disk drive 1 in order of cluster address, recorded in the FAT area 23B, thus obtaining a reproduction result at the forward normal speed.

In a forward reproduction at a relatively low speed such as a double speed, video data are successively reproduced and decoded in a similar manner. According to a reproduction speed, pictures are selected and outputted from the decoded results of consecutive pictures, thus obtaining a reproduction result at a desired reproduction speed.

On the other hand, when one GOP of the video data is set at 0.5 second intervals, for fast forward reproduction of 15 times speed, pointer GOPX's are successively set in corresponding GOP table 23C, so that video data are reproduced from the hard disk drive 1 by means of cluster addresses detected based on the pointer GOPX's, then decoded so as to selectively reproduce I-pictures set at 0.5 second intervals, thus obtaining reproduction result of a fast forward reproduction.

For 30 times speed, 45 times speed, etc., in the GOP table 23C the pointer GOPX's are changed according to the reproduction speed. By means of cluster addresses detected by the pointer GOPX's, video data are obtained from the hard disk drive 1 and decoded so that I-pictures are selectively reproduced according to the reproduction speed, thereby obtaining fast forward reproduction result by means of 30 times speed, 40 times speed, etc.

On the other hand, for a reproduction speed between 15 times speed and 30 times speed or between 30 times speed and 45 times speed, data in the FAT area 23B are searched with rendering an I-picture in the haed, the I-picture being detected by means of the GOP table 23C, so that one GOP of data having the I-picture in the top or haed are reproduced from the hard disk drive 1. By selectively outputting a picture from the reproduction result according to the reproduction speed, a reproduction result based on forward reproduction of corresponding reproduction speed may be obtained. For such data production for one GOP, a pointer GOPY is set to subsequent I-picture in the GOP table 23C, and the data in the FAT area 23B within a range between a pointer GOPX and the pointer GOPY are searched so as to easily and reliably reproduce one GOP of data from the hard disk drive 1.

On the other hand, for reverse reproduction, the pointers GOPX, GOPY are set starting with the end of corresponding GOP table 23C in a similar manner. The data in the FAT area 23B are searched within a range between the pointers GOPX, GOPY, so that one GOP of data is reproduced from the hard disk drive 1. The one GOP of data is decoded, rearranged, and outputted so as to obtain a reverse reproduction result at a relatively low speed.

For fast reverse reproduction such as 15 times speed, 30 times speed, 45 times speed, etc., cluster addresses of I-pictures are successively detected from the end of corresponding GOP table 23C. According to the cluster addresses, video data are reproduced so as to obtain a fast reverse reproduction result such as 15 times speed, 30 times speed, 45 times speed, etc.

For a reverse reproduction at a reproduction speed between 15 times speed and 30 times speed or between 30 times speed and 45 times speed, the pointers GOPX, GOPY are set starting with the end of corresponding GOP table 23C according to the reproduction speed. The data in the FAT area 23B are searched within a range between the pointers GOPX, GOPY, so that one GOP of data are reproduced from the hard disk drive 1. The one GOP of data are decoded, and then pictures are selectively outputted according to the reproduction speed, thereby obtaining a fast reproduction result for the reproduction speeds.

On the other hand, such GOP table 23C when recording is easily prepared in such a way that according to a notice from an encoder, corresponding cluster address is recorded, further based on control codes as in the MPEG format, corresponding cluster address is recorded. As for a reference by means of such control codes, for example, an SHC (Sequence Header Code) may be employed indicating a start of a sequence layer.

Figure 3:
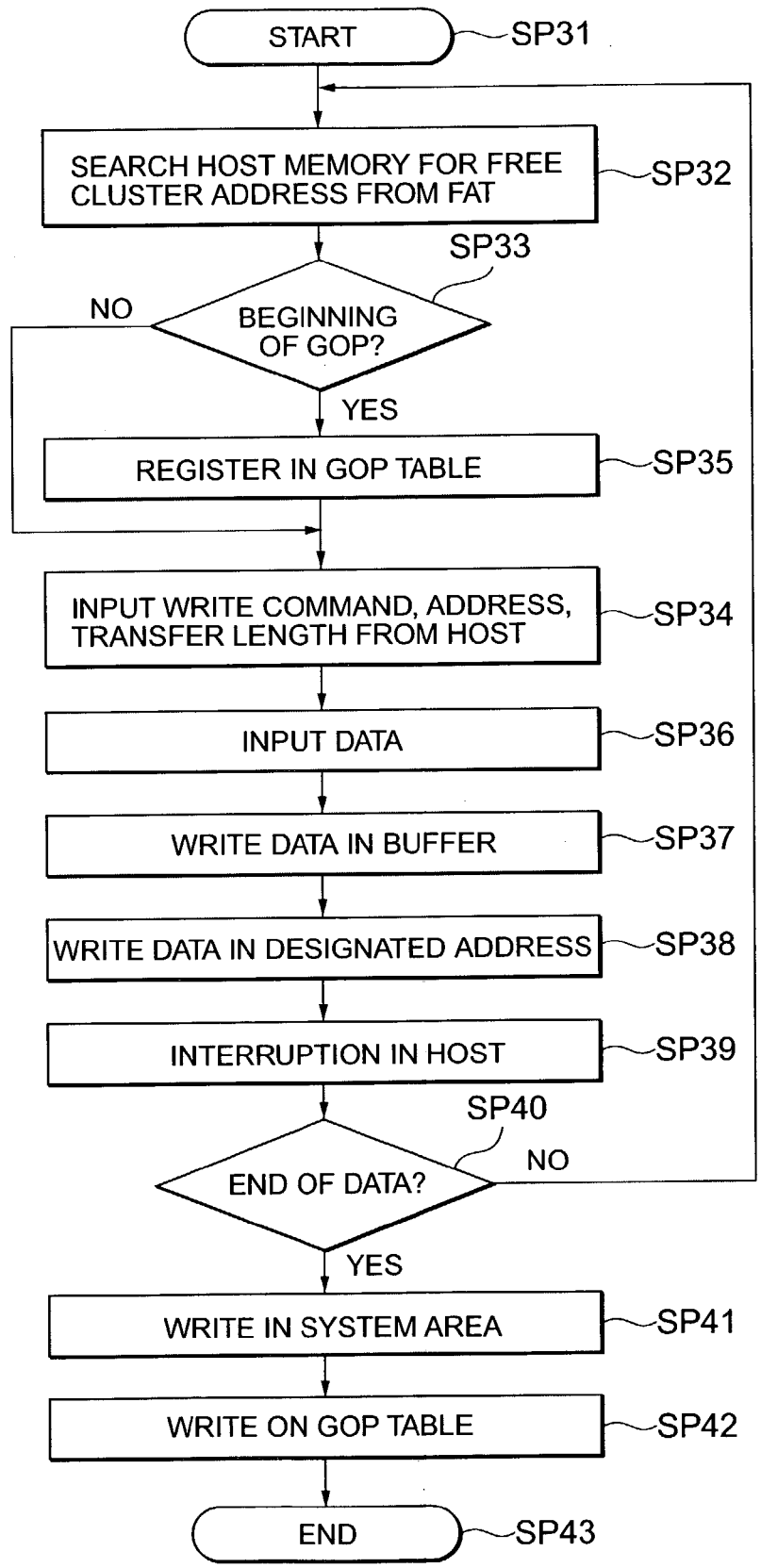
FIG. 3 a flow chart showing a procedure when recording a moving image file in the AV system of FIG. 2.
Figure 4:
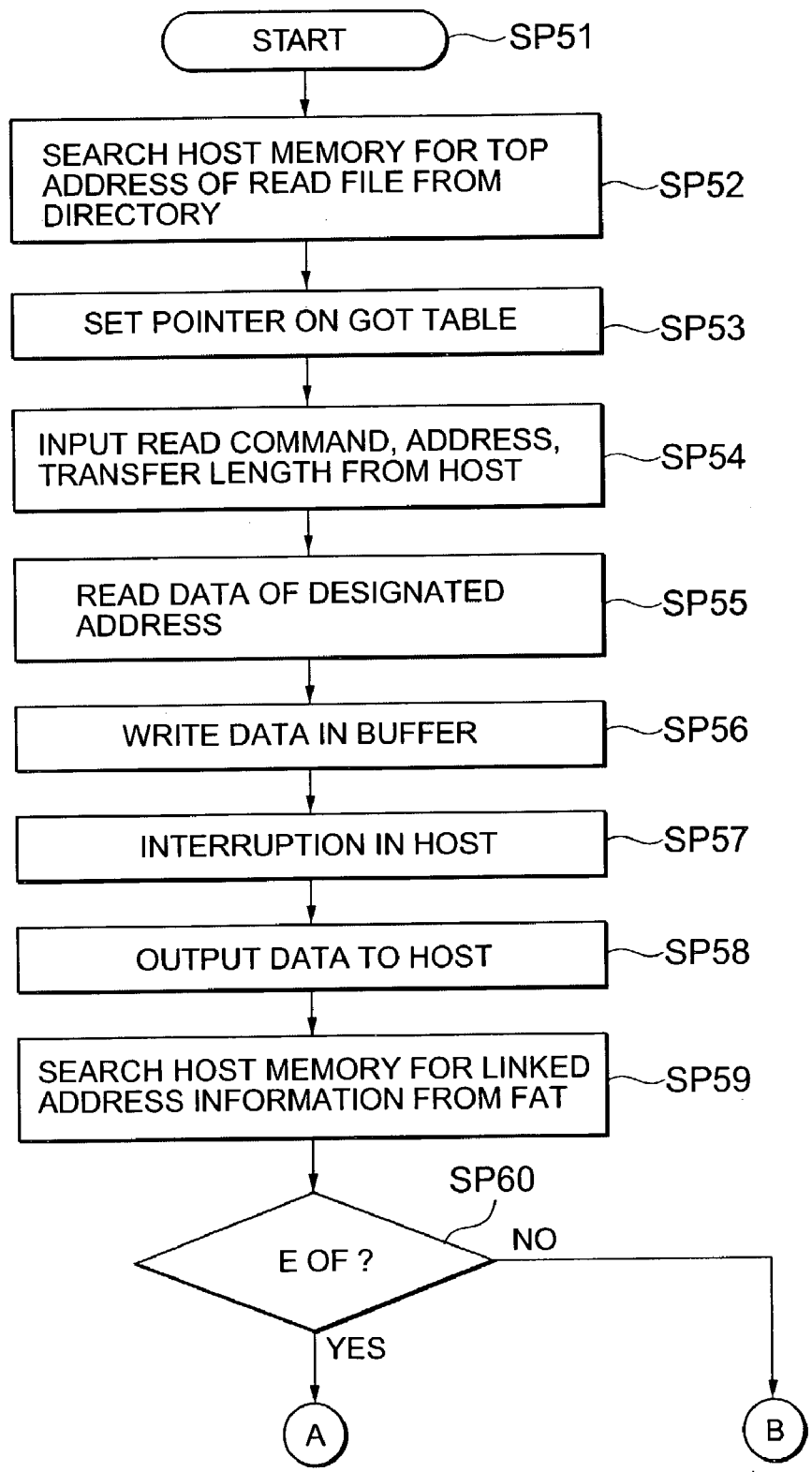
FIG. 4 is a flow chart showing a procedure when reproducing the moving image file in the AV system of FIG. 2.
Figure 23:
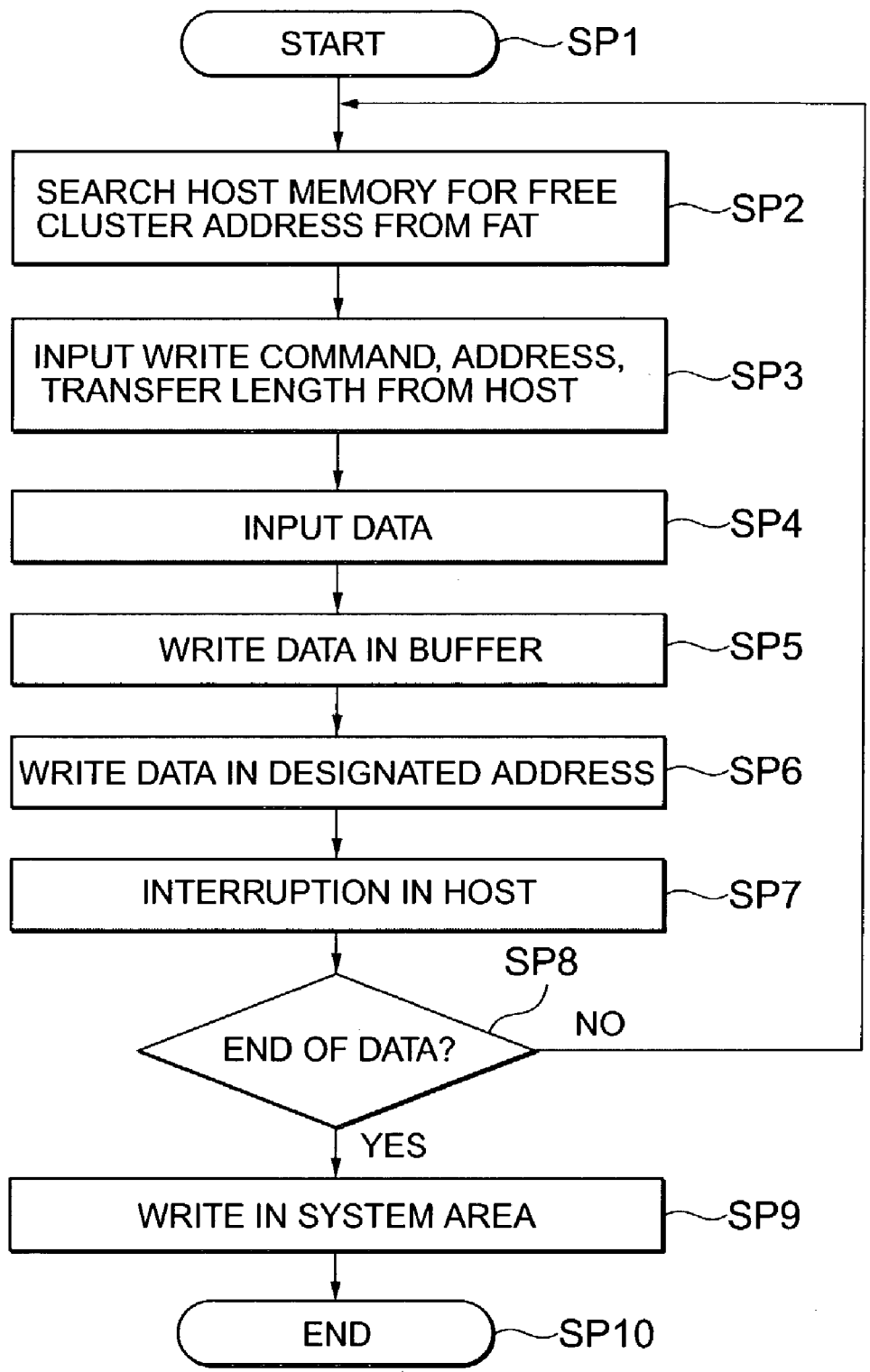
FIG. 23 is a flow chart showing a procedure in the case of recording in the system of FIG. 19.

FIG. 3 is a flow chart showing a procedure of the AV system 21 together with preparation of such a GOP table 23C. In the AV system 21, the procedure is executed when recording video data based on the MPEG standard, the above mentioned procedure with respect to FIG. 23 is executed when recording other files.

In other words, starting with the procedure, the AV system 21 moves from step SP31 to step SP32, and searches the FAT area 23B constructed in the system memory 23, that is a host memory, by the central processing unit 24 so as to detect a free cluster address. Then the AV system 21 moves to step SP33, determines whether or not the detected free cluster address is a head of the GOP according to the notice from the encoder or by monitoring control codes, then moves directly to step SP34 when a negative result is obtained. On the other hand, when a positive result is obtained in step SP33, the process moves from step SP33 to step SP35, records corresponding cluster address in the system memory 23 to thereby input a cluster address of an I-picture into the GOP table and moves to step SP34.

Instep SP34, the AV system 21 issues a write command where a parameter is set with respect to the free cluster address detected by the central processing unit 12 in step SP32 and a transfer length, then in subsequent step SP36 data provided for recording are outputted to the hard disk drive 1 by the transfer length. In subsequent step SP37, the hard disk drive 1 records transmitted data corresponding to the write command in the buffer memory 10, then in subsequent step SP38 successively records the data recorded in the buffer memory 10 in free clusters designated by the host apparatus 22.

Upon completion of recording the data transmitted from the host apparatus 22 in this way, the hard disk drive 1 interrupts the host apparatus 22 in step SP39. Because of the interruption, the host apparatus 22 moves to step SP40 so as to determine whether or not transferring the data provided for recording has been completed, and returns to step SP32, if a negative result is obtained. Thus, while inputting a cluster address into the GOP table for each I-picture, the AV system 21 repeatedly issues the write command and transfers data. Corresponding to the command, the hard disk drive 1 successively records video data in free clusters designated by the host apparatus 22.

On the other hand, upon completion of transferring the data provided for recording, a positive result is obtained in step SP40. Then, the host apparatus 22 moves to step SP41, updates contents in the FAT area 23B and the directory area 23A recorded in the system memory 23 so as to correspond to the records in the file, instructs the hard disk drive 1 to update the system entry area in order to correspond to the update of the contents.

In subsequent step SP42, with respect to the GOP table 23C where cluster codes are successively inputted, according to execution of the above mentioned procedure with respect to FIG. 23, the hard disk drive 1 is provided with instructions to record a file based on the data of the GOP table 23C. Corresponding to the records of the GOP table file, the contents of the FAT area 23B and the directory area 23A recorded in the host memory 23 are updated. In order to correspond to the update, the hard disk drive 1 is provided with instructions to update the system entry area. Then in step SP43 the procedure is terminated.

On the other hand, FIG. 4 to FIG. 7 are flow charts showing procedures when thus recorded moving image file is reproduced forward. The AV system 21 executes the procedure with respect to the video file based on the MPEG standard. In other words, when starting the procedure, the AV system 21 moves from step SP51 to step SP52, and causes the central processing unit 24 to search the directory area 23A in the system memory 23 so as to detect a top cluster number of the objective file.

Upon detection of the top cluster number, the central processing unit 24 sets a pointer at a location of corresponding cluster address of the GOP table 23C in step SP53. Then, in step SP54 the central processing unit 24 sets a parameter based on the top cluster address and a transfer length so as to issue a read command.

When the host apparatus 22 issues the read command in this way, in subsequent step SP55 the hard disk drive 1 reads the data designated by the command from the hard disk 3. In subsequent step SP56, the read data are temporarily stored in the buffer memory 10. Upon completion of the reading, the host apparatus 22 is interrupted in subsequent step SP57. Because of the interruption, the central processing unit 24 of the host apparatus 22 moves to step SP58 and instructs the hard disk drive 1 to transfer the data. Due to the instructions, in the hard disk drive 1, the temporarily recorded user data in the buffer memory 10 are outputted to the host apparatus 22.

When inputting the user data corresponding to one read command in this way, then in subsequent step SP59 the host apparatus 22 searches the host memory 23 for detecting an address of subsequent cluster based on a linked cluster number from the data in the FAT area. Further, in subsequent step SP60 the host apparatus 22 determines whether or not a code based on the thus detected address is an EOF.

Figure 5:
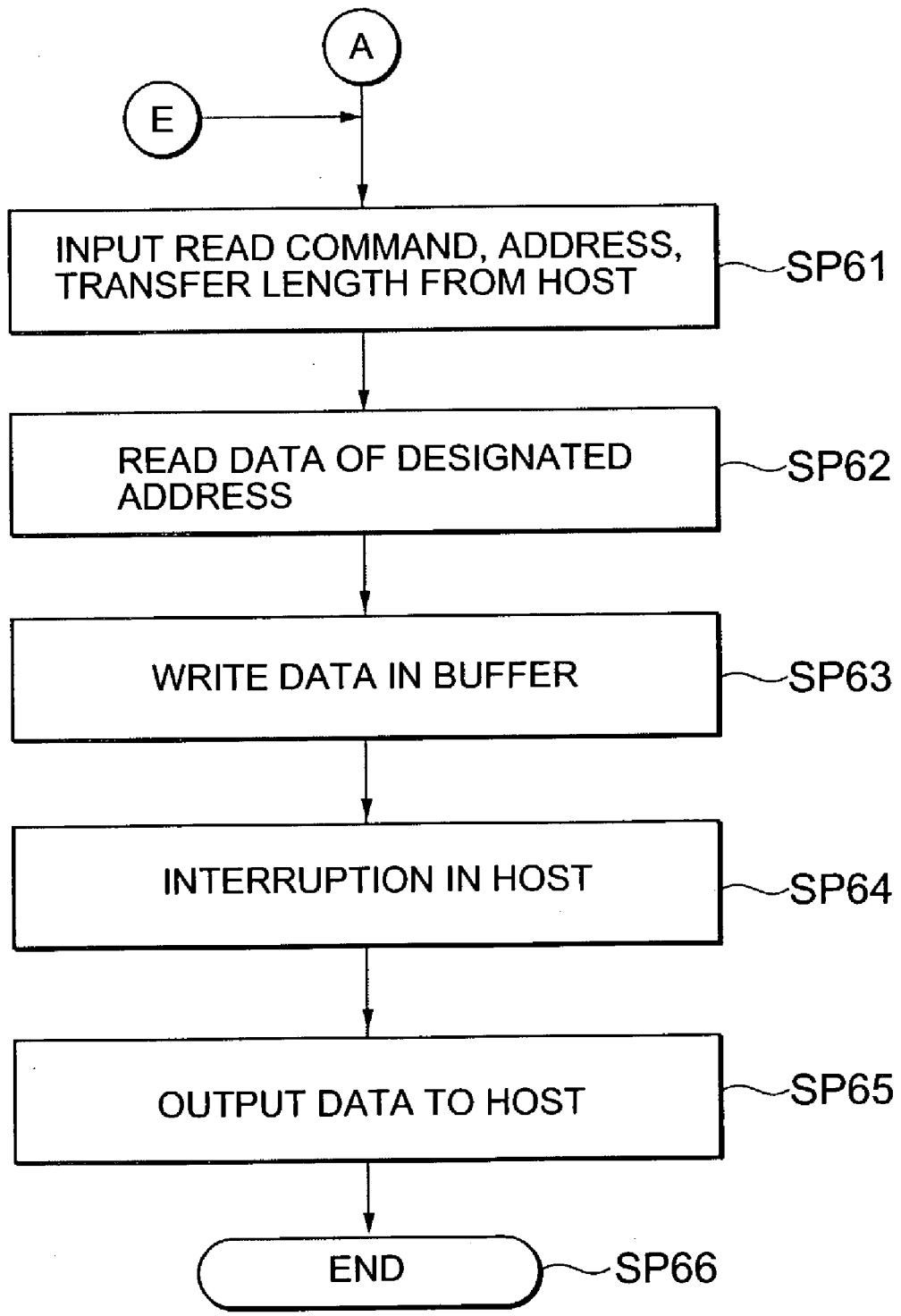
FIG. 5 is a flow chart following FIG. 4 in the case of an EOF.

When a positive result is obtained in the step, the central processing unit 24 moves to step SP61 (see FIG. 5). Then, the central processing unit 24 sets a parameter and issues a write command for the rest of the user data up to the cluster where the EOF is set.

When the host apparatus 22 issues the read command in this way, then in subsequent step SP62 the hard disk drive 1 reads the data designated by the command from the hard disk 3. In subsequent step SP63, the read data are temporarily stored in the buffer memory 10. Upon completion of the reading, the host apparatus 22 is interrupted in subsequent step SP64. Because of the interruption, the host apparatus 22 moves to step SP65 and instructs the hard disk drive 1 to transfer the data. Due to the instructions the hard disk drive 1 outputs the temporarily recorded user data in the buffer memory 10 to the host apparatus 22, then moves to step 66 so as to terminate the procedure.

Figure 6:
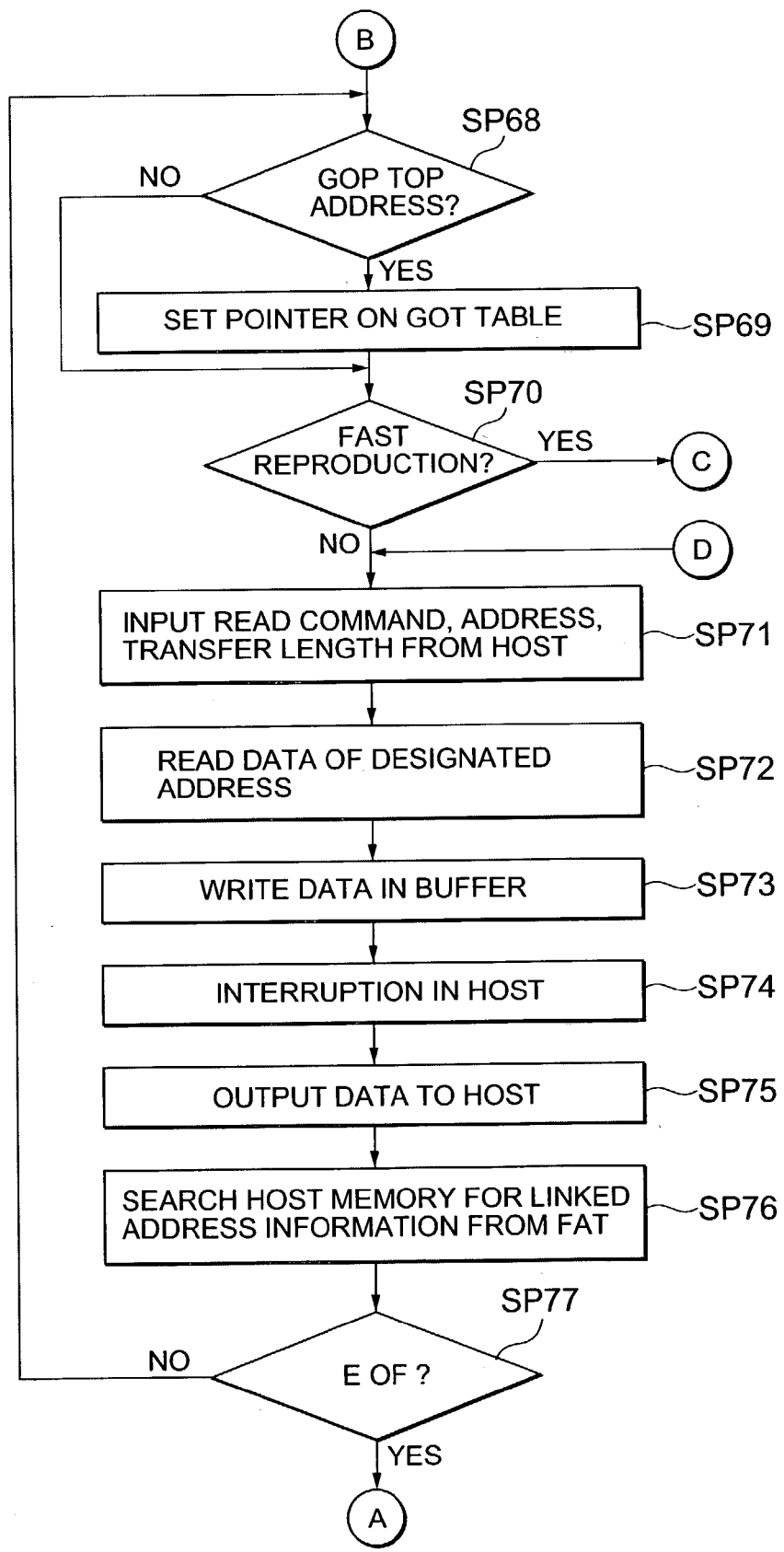
FIG. 6 is a flow chart following FIG. 4 not in the case of the EOF.

On the other hand, when a negative result is obtained in step SP60, the AV system 21 moves from step SP60 to step SP68 (see FIG. 6). Based on the records in the GOP table 23C, the central processing unit 24 determines whether or not the address detected in step SP58 is a top address of GOP. When a positive result is obtained in the step, the central processing unit 24 updates the pointer of the GOP table 23C to correspond to the address, then moves to step SP70. On the other hand, when a negative result is obtained in step SP69, the process moves to step SP70.

In step SP70 the central processing unit 24 determines whether or not the reproduction designated by the user is faster reproduction than a predetermined reproduction speed. When a negative result is obtained, the central processing unit 24 sets a parameter according to the detected cluster address and the transfer length so as to issue a read command in step SP71.

When the host apparatus 22 issues the read command in this way, then in subsequent step SP72 the hard disk drive 1 reads the data designated by the command from the hard disk 3. In subsequent step SP73, the read data are temporarily stored in the buffer memory 10. Upon completion of the reading, the host apparatus 22 is interrupted in subsequent step SP74. Because of the interruption, the central processing unit 24 of the host apparatus 22 moves to step SP75 and instructs the hard disk drive 1 to transfer the data. Due to the instructions, in the hard disk drive 1, the temporarily recorded user data in the buffer memory 10 are outputted to the host apparatus 22.

When inputting the user data corresponding to one read command in this way, then in subsequent step SP76 the host apparatus 22 searches the host memory 23 for detecting an address of subsequent cluster based on a linked cluster number from the data in the FAT area. Further, in subsequent step SP77 the host apparatus 22 determines whether or not a code based on the thus detected address is an EOF. The host apparatus 22 moves to step SP61 (see FIG. 5) when a positive result is obtained, or returns to step SP68 when a negative result is obtained.

Figure 24:
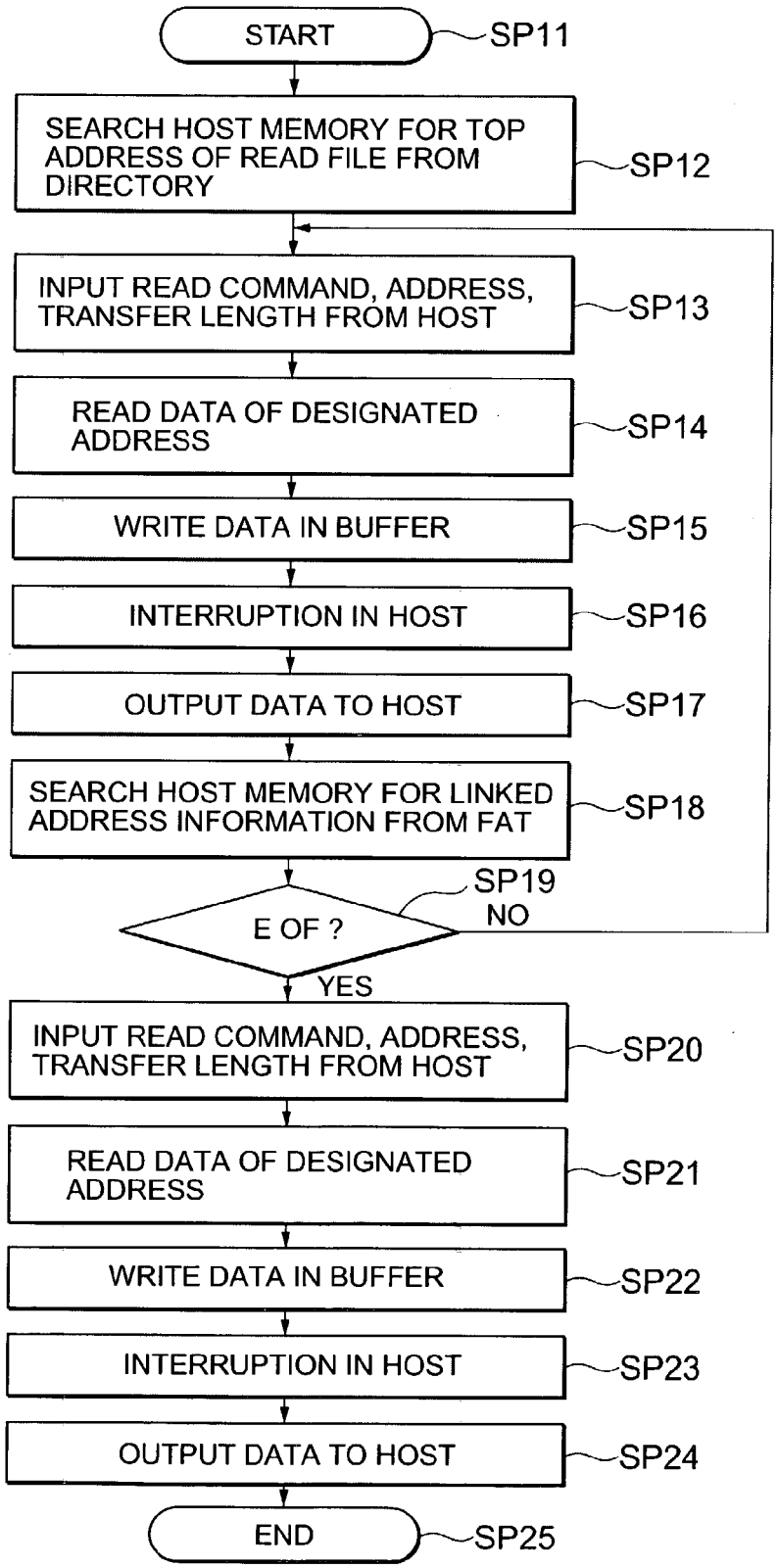
FIG. 24 is a flow chart showing a conventional procedure in the case of reproduction in the system of FIG. 19.
Figure 25:
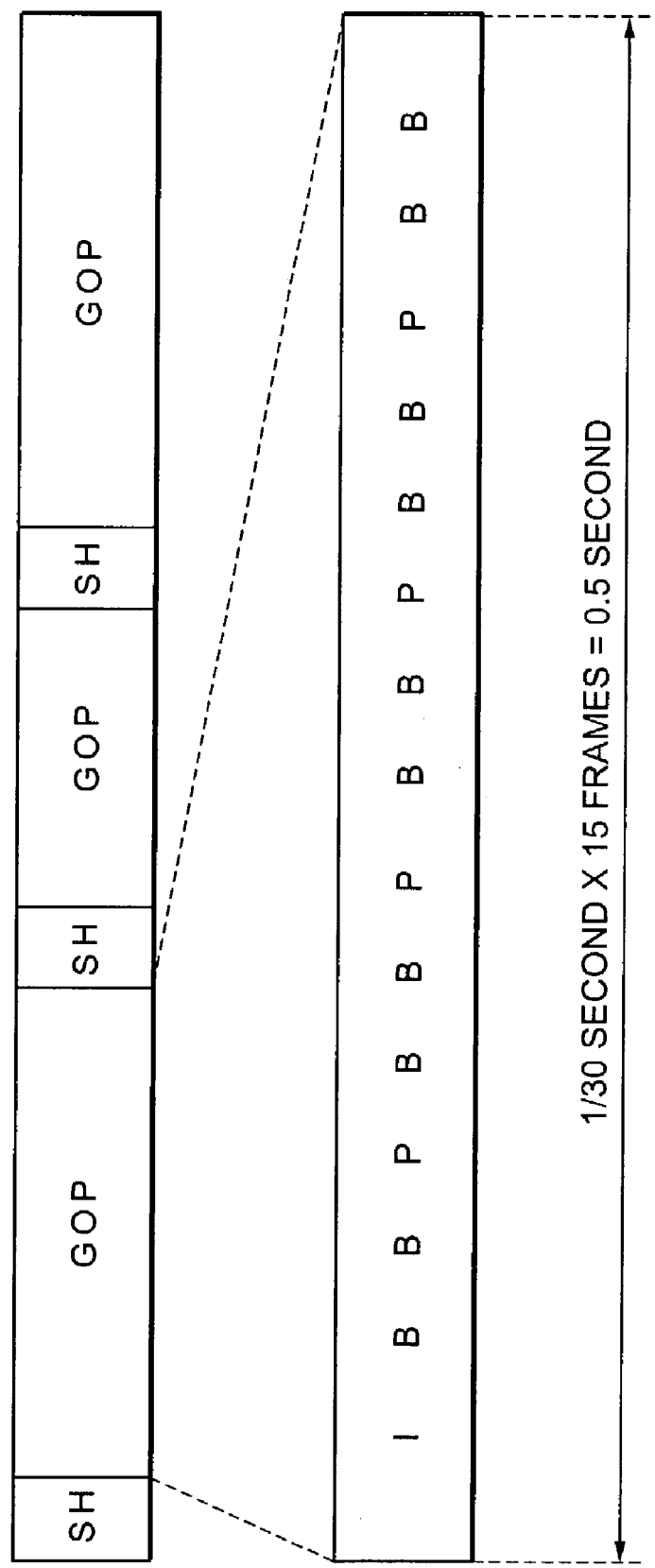
FIG. 25 is a chart showing a GOP in the prior art.

As a result, in this preferred embodiment of the present invention, when reproducing at a normal reproduction speed or when performing a fast reproduction at a relatively low speed, moving image files may be successively reproduced in a similar manner as described above with respect to FIG. 24. Thus, in this case the host apparatus 22 successively decodes video data based on moving image files obtained from the hard disk drive 1 in this manner so as to output the data to an external apparatus, for example.

Figure 7:
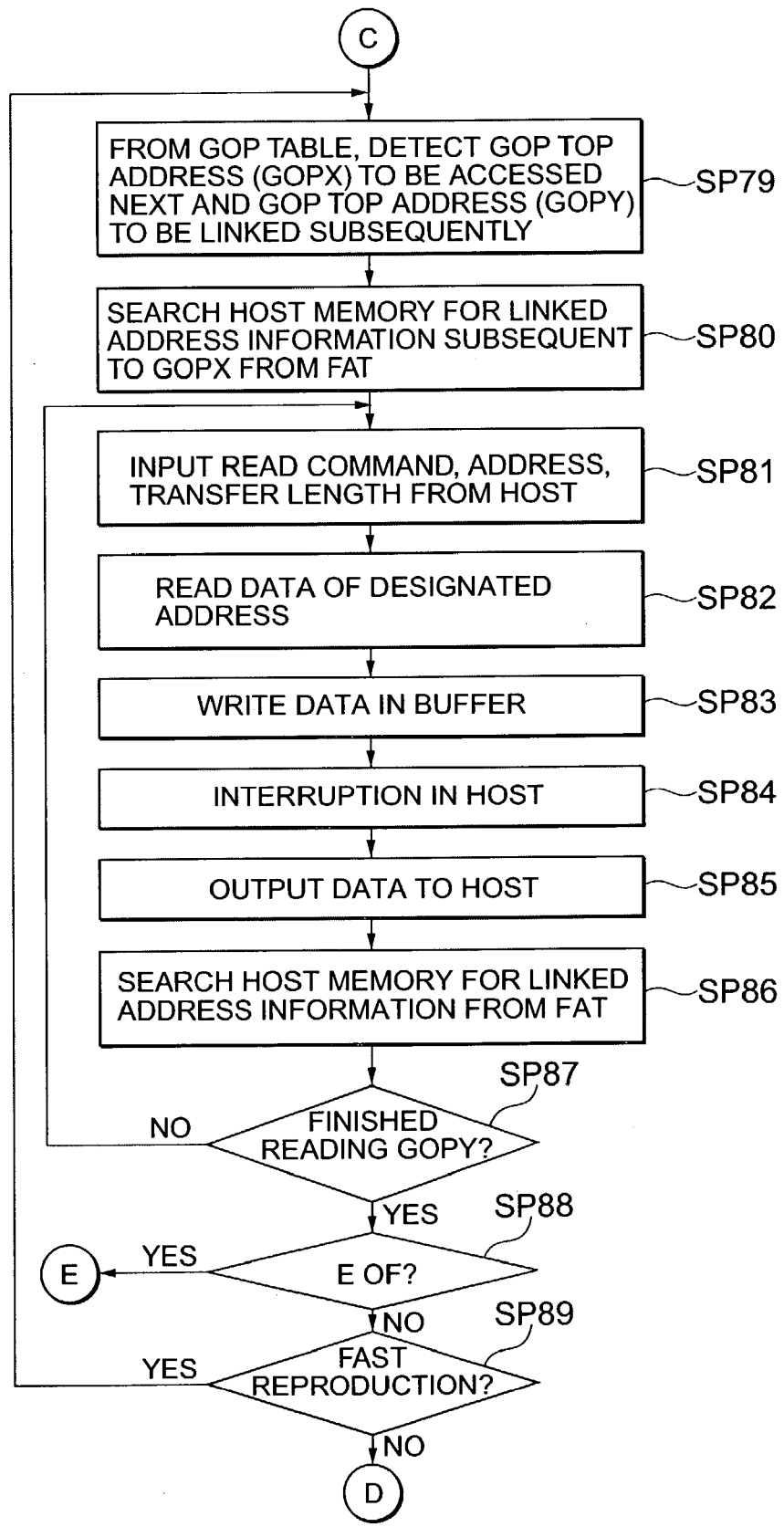
FIG. 7 is a flow chart following FIG. 6 in the case of fast reproduction.

On the other hand, when a positive result is obtained in step SP70, the central processing unit 24 moves from step SP70 to step SP79 (see FIG. 7). According to the reproduction speed, the central processing unit 24 detects a top address of the GOP to be subsequently accessed (which is the address indicated by the pointer GOPX in FIG. 1) and a top address of the following GOP (which is the address indicated by the pointer GOPY in FIG. 1), whereby the central processing unit 24 may detect a GOP to be reproduced.

With reference to the example as shown in FIG. 1, the central processing unit 24 detects a cluster address represented by an address 0158h advanced by 15 GOP's in a situation where a cluster address represented by 0021h indicated by a reference sign A is designated by a pointer in the GOP table 23C and in case a reproduction speed designated by the user is a reproduction speed being such that a frame advanced by 15 GOP's is subsequently reproduced. Further, as a top address of a subsequent GOP, a cluster address represented by an address 0165h is detected.

Then, in step SP80 the central processing unit 24 searches the FAT area 23B in the system area 23 for detecting a cluster address to be subsequently reproduced with respect to the GOP detected in step SP79. Further, in step SP80, the central processing unit 24 sets a parameter based on the detected cluster address and a transfer length so as to issue a read command to the hard disk drive 1.

When the host apparatus 22 issues the read command in this way, then in subsequent step SP82 the hard disk drive 1 reads the data designated by the command from the hard disk 3. In subsequent step SP83, the read data are temporarily stored in the buffer memory 10. Upon completion of the reading, the host apparatus 22 is interrupted in subsequent step SP84. Because of the interruption, the central processing unit 24 of the host apparatus 22 moves to step SP85 and instructs the hard disk drive 1 to transfer the data. Due to the instructions, in the hard disk drive 1, the temporarily recorded user data in the buffer memory 10 are outputted to the host apparatus 22.

When inputting the user data corresponding to one read command in this way, then in subsequent step SP86 the host apparatus 22 searches the host memory 23 for detecting an address of subsequent cluster based on a linked cluster number from the data in the FAT area. Further, in subsequent step SP87 the host apparatus 22 determines whether or not the thus detected address is the top address of subsequent GOP detected in step SP80. When a negative result is obtained, the host apparatus 22 returns to step SP81.

As a result the AV system 21 repeats the procedure of the steps SP80-SP81-SP82-SP83-SP84-SP85-SP86-SP87-SP81 so as to reproduce the video data with respect to the GOP detected in step SP80. After completing the reproduction of the one GOP of video data, the AV system 21 moves to step SP88 when a positive result is obtained in step SP87. In the step, the central processing unit 24 determines whether or not the code based on the address detected in the immediately previous step SP86 is EOF. When a positive result is obtained, the process moves from step SP88 to step SP61.

On the other hand, when a negative result is obtained in step SP88, the process moves to step SP89 so as to determine whether it is fast reproduction in a similar manner to step SP70. When a positive result is obtained, the central processing unit 24 returns to step SP79. On the other hand, when a negative result is obtained, the central processing unit 24 moves to step SP71.

As a result, in this preferred embodiment of the present invention, according to the reproduction speed, the central processing unit 24 detects the GOP subsequently reproduced from the GOP table 23C. Based on the detection result, one GOP of data may be reproduced from the hard disk 3. In this way, when the one GOP of video data are obtained from the hard disk drive 1, the host apparatus 22 decodes the video data so as to obtain one GOP of consecutive pictures, whereby all the pictures are outputted.

As a result, assuming that one GOP comprises 15 frames for 0.5 second, for example, and reproduction is performed by skipping the GOP table in 15 GOP units, and that 15 frames constituting one GOP are allocated to the period of 15 GOP's ×15 frames, a reproduction result may be outputted at 15 times speed, which is fast reproduction. It should be understood that, according to the reproduction speed, corresponding pictures could be selectively outputted as special reproduction of the reproduction result On the other hand, for reverse reproduction, cluster addresses are detected in the reverse order to that described in FIG. 4 to FIG. 7 so as to reproduce and decode video data successively from the hard disk drive 1 by units of GOP, whereby resulting pictures are rearranged and selectively outputted so as to output similar reproduction results.

(1-2) Operation of the First Preferred Embodiment of the Present Invention

In the above structure, when the power supply is started up in the AV system 21, the data in the system entry area are reproduced in the hard disk drive 1. Among the data in the system area, data in the directory area and the FAT area are transferred from the hard disk drive 1 to the host apparatus 22 and recorded in the system memory 23 of the host apparatus 22. In this way, in the AV system 21 the management data with respect to the FAT file system are recorded in the system memory 23 of the host apparatus 22. When reproducing moving image files other than those of the MPEG standard, according to the management data with respect to the FAT file system, the hard disk drive 1 reproduces a variety of files by reproducing the hard disk 3. Even when recording moving image files other than those of the MPEG standard, with reference to the management data recorded in the system memory 23, operation of the hard disk drive 1 is controlled so as to record the files in the hard disk 3.

As a result, the AV system 21 may control the operation of the hard disk drive 1 by means of the file management system having high compatibility with a computer.

On the other hand, when recording the moving image files based on the MPEG standard in the hard disk 3, in the host apparatus 22, according to the notice from the encoder for encoding the moving image files or the control codes, the heads of the GOP's are detected, and the cluster addresses where the heads of the intraframe encoded I-pictures (the head of the GOP's) are recorded are successively detected. In the host apparatus 22, for each moving image file, thus detected consecutive cluster addresses are consecutively recorded in the system memory 23 so as to construct the GOP table 23C. After completing recording the moving image files into the hard disk, the GOP table 23C is outputted to the hard disk drive 1, and the GOP table of the moving image files is recorded in one file on the hard disk 3. When starting up, subsequent to loading data to the system memory 23 with respect to the system entry area, all the files of the GOP table are read from the hard disk 3 and then recorded in the system memory 23.

In the AV system 21, a breakpoint of the GOP which is a unit of encoding may be detected by means of the GOP table 23C, so that, for fast reproduction, reverse reproduction, video data are reproduced from the hard disk 3 by units of GOP, i.e., on a GOP by GOP basis, with reference to the GOP table 23C and the video data are processed so as to output a reproduction result of fast reproduction.

In other words, since only the head positions of the GOP's are recorded in the GOP table 23C, when performing reverse reproduction, target cluster addresses may be searched at a considerably high speed compared with the case of detection of clusters having a desired picture recorded thereon by successively tracing the data in the FAT. The video data with respect to the MPEG standard can be decoded only by the unit of GOP, which is the unit of encoding, whereas the GOP table may be searched by the unit of GOP, to thereby efficiently reproduce the video data by the unit of GOP.

In addition, for fast reproduction, the GOP's successively reproduced in this way may be selected corresponding to a reproduction speed and reproduced at a considerably higher speed.

As a result a variety of special reproduction processes as in the DVD player may be executed.

As a result of such processes, in the AV system 21 the GOP table is recorded in the hard disk 3 by means of a file. When obtaining data in the system entry area, the file is reproduced through the GOP table so as to construct the GOP table in the system memory. Based on the GOP table, the host apparatus controls the hard disk drive 1 so as to reproduce the file by the unit of GOP. In the hard disk drive 1, a construction of the conventional FAT file system may be used, whereby a variety of hard disk drives may be employed.

(1-3) Benefits of the First Preferred Embodiment of the Present Invention

As described above, in the FAT file system, the GOP table which is the moving image file management table is formed so as to specify a limit or boundary of a unit of encoding and to utilize the moving image file management table for reproducing moving image files, thereby specially reproducing video data recorded by data-compression, while maintaining compatibility with a computer.

Further, since the addresses recorded in the moving image file management table are the addresses where the I-pictures based on the MPEG standard are recorded, the addresses may be easily detected by means of the notice from the encoder and control codes as well.

Further, since the unit of encoding is the GOP based on the MPEG standard, the moving image files compressed according to the MPEG standard may be processed.

The file management table is constructed corresponding to the records of the moving image files, so that files immediately after the recording may be specially reproduced.

In other words, with reference to the moving image file management table, the moving image file may be reproduced from the recording medium by one unit of encoding and then decoded, so that the moving image file may be reproduced at a reproduction speed corresponding to the selection of the unit of encoding which is subject to reproduction.

Further, with reference to the moving image file management table, the moving image file may be reproduced from the recording medium by one unit of encoding and then decoded, and pictures may be rearranged, thereby realizing reverse reproduction at a different reproduction speed.

The file management data, the management table, and the moving image file management table are obtained from the hard disk drive which is a apparatus having the recording medium in order to maintain them in the system memory. Based on the record in the system memory, a command to the hard disk drive is outputted so as to execute reproduction processes of such moving image files, thus employing apparatuses such as a general-purpose hard disk drive.

According to the record of the moving image file in the hard disk drive, the record in the system memory is updated. In order to correspond to the updating of the memory, the hard disk drive is provided with instructions to update the file management data, moving image file management data, etc., whereby special reproduction may be similarly carried out even if the hard disk drive is connected to an apparatus of similar kind.

(2) Second Preferred Embodiment of the Present Invention

Figure 8:
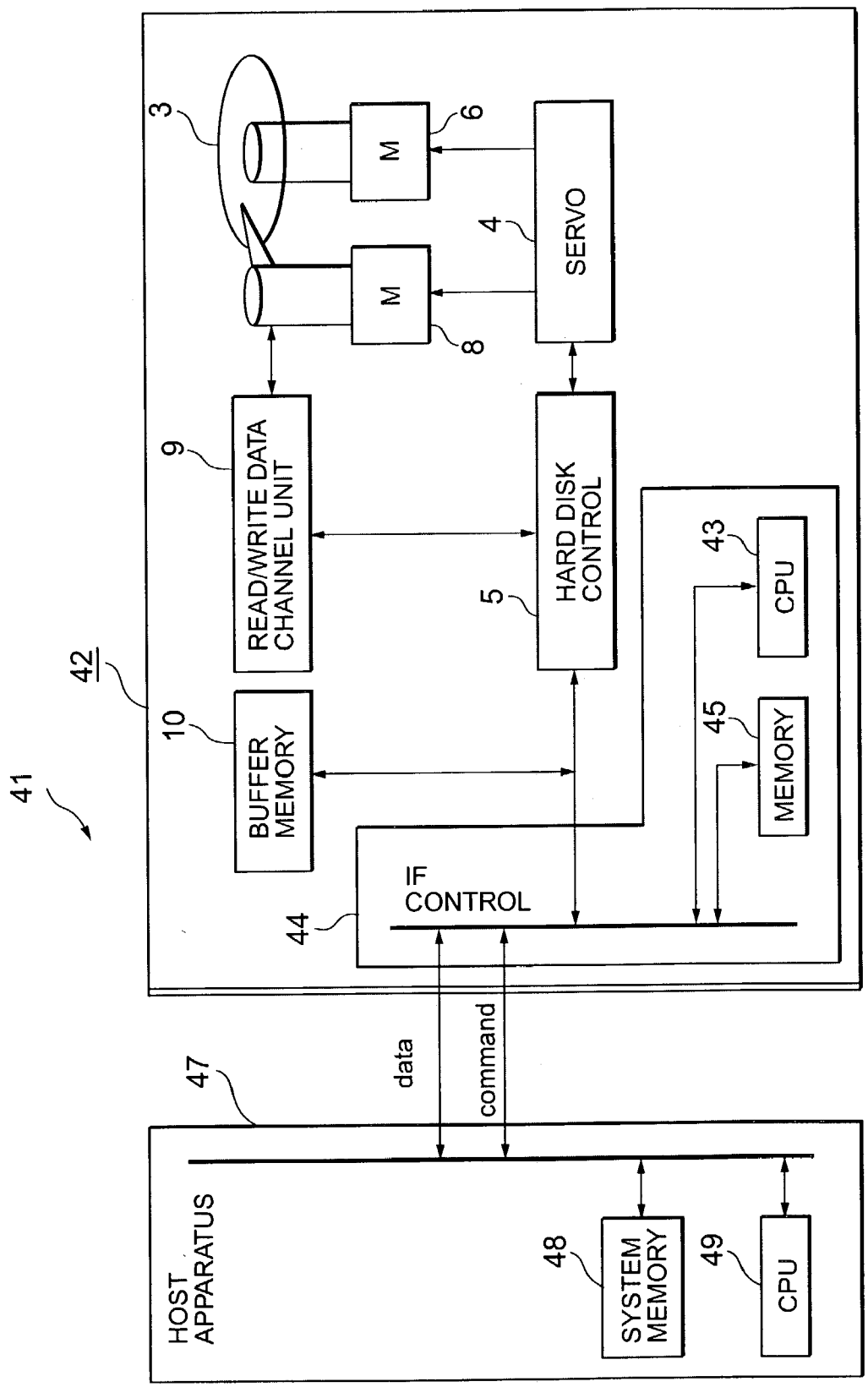
FIG. 8 is a block diagram showing an AV system with respect to the second embodiment according to the present invention.

FIG. 8 is a block diagram showing an AV system with respect to the second preferred embodiment of the present invention. In the AV system 41, a hard disk drive 42 executes a pre-recorded procedure program by means of a central processing unit 43 of an interface control circuit 44 and outputs only data in the directory area recorded on the hard disk 3 to a host apparatus 47. On the other hand data in the FAT area and data in the GOP table are maintained in a built-in memory 45.

On the other hand, in the host apparatus 47, by executing a similar procedure program, the thus notified data in the directory area are recorded and maintained in a system memory 48. Further, in a central processing unit 49, based on the record in the system memory 48, a file name is designated so as to instruct the hard disk drive 42 to reproduce the file. In the hard disk drive 42, according to the instructions, the data in the FAT recorded in the memory 45 are successively traced so as to reproduce the data in the hard disk 3, whereby resulting reproduction data are outputted to the host apparatus 47.

In the host apparatus 47, a write command is transmitted and the data of the file are successively outputted to the hard disk drive 42. In the hard disk drive 42, the FAT is searched for successively detecting free spaces. According to the resulting detection, the data are recorded on the hard disk 3.

As a result, compared with a conventional system, the AV system 41 is configured to greatly simplify processes in the host apparatus 47, to increase a speed of data transfer processing between the host apparatus 47 and the hard disk drive 42 and to simplify the data transfer processing.

Figure 9:
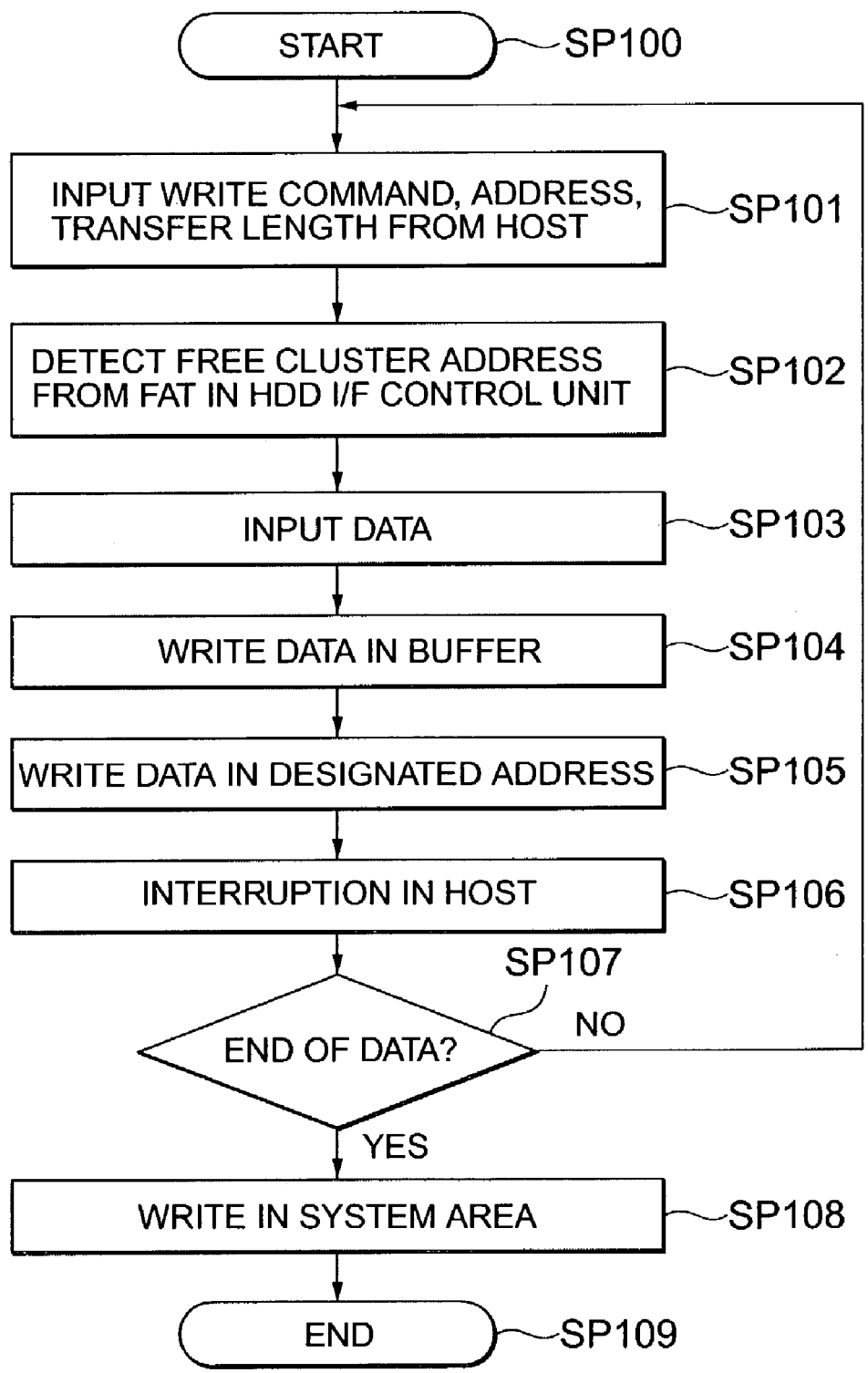
FIG. 9 is a flow chart showing a procedure when recording a usual file in the AV system of FIG. 8.

In other words, FIG. 9 is a flow chart showing a writing procedure in the AV system 41. Starting with the procedure, in the host apparatus 47, the central processing unit 49 moves from step SP100 to step SP101, sets a parameter based on the file name a transfer length, and issues a write command to the hard disk drive 42.

According the command, in subsequent step SP102 the hard disk drive 42 searches the FAT recorded in the memory 45 for detecting free cluster addresses.

When detecting free cluster addresses in this way, in subsequent step SP103 the hard disk drive 42 receives data transmitted from the host apparatus 47, and then in subsequent step SP104 records the data in the buffer memory 10. Further, in step SP105 the data recorded in the buffer memory 10 are successively recorded in the free clusters detected in step SP102.

After finishing recording the data transmitted from the host apparatus 47 in this way, in step SP106 the hard disk drive 42 interrupts the host apparatus 47. Because of the interruption, the host apparatus 47 moves to step SP107 and determines whether or not all the data to be recorded have transferred, and returns to step SP101 if a negative result is obtained. Thus, the AV system 41 successively detects free areas on the hard disk drive 42 side so as to record outputted data from the host apparatus 47 in the hard disk 3. After finishing transferring all the data to be recorded, the AV system 41 moves to step SP108 when a positive result is obtained in step SP107. Then, the host apparatus 47 updates the records in the directory area which have been maintained in the system memory 48. The hard disk drive 42 updates the system entry area in the hard disk 3 with the data recorded in the FAT area and the data in the directory area of the host apparatus 48, then moves to step SP109 so as to terminate the procedure.

Figure 10:
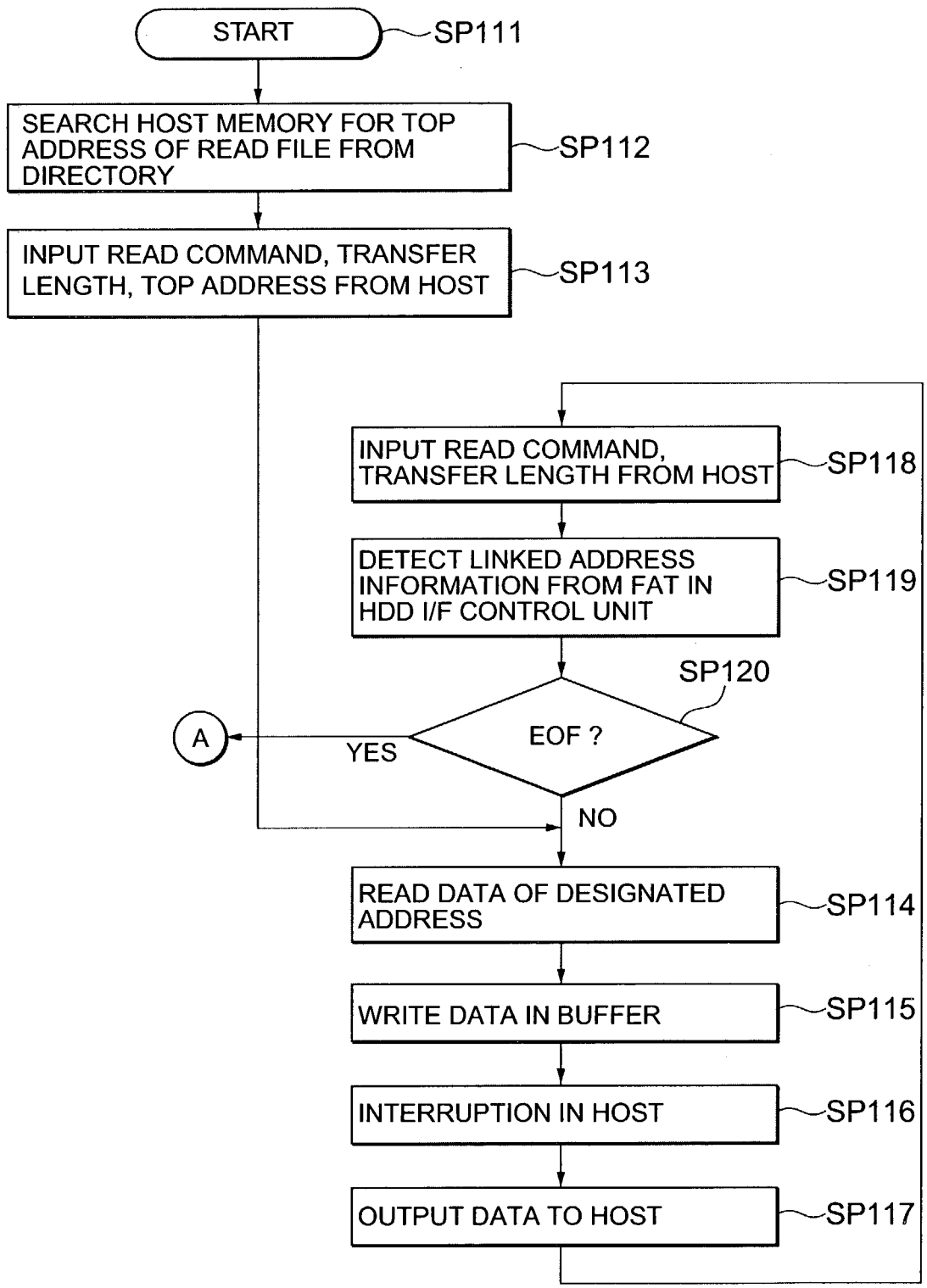
FIG. 10 is a flow chart showing a procedure when reproducing the usual file in the AV system of FIG. 8.

On the other hand, FIG. 10 is a flow chart showing a reading process in the AV system 41. The central processing unit 49 in the host apparatus 47 moves from step SP111 to step SP112, searches the data in the directory area recorded in the system memory 48 for detecting a top cluster number of a file to be read from the data in the directory area.

Upon detection of the top cluster number, the central processing unit 49 moves to step SP113, sets a parameter based on the top cluster address and a transfer length so as to issue a read command.

When the host apparatus 47 issues the read command in this way, in subsequent step SP114 the hard disk drive 42 reads the data designated by the command from the hard disk 3. In subsequent step SP115, the read data are temporarily stored in the buffer memory 10. Upon completion of the reading, the host apparatus 47 is interrupted in subsequent step SP116. Because of the interruption, the central processing unit 49 of the host apparatus 47 moves to step SP117 and instructs the hard disk drive 42 to transfer the data. Due to the instructions, in the hard disk drive 42, the temporarily recorded user data in the buffer memory 10 are outputted to the host apparatus 47.

When inputting the user data corresponding to one read command in this way, then in subsequent step SP118 the host apparatus 47 sets only a transfer length, then issues a read command. When the host apparatus 47 issues the read command in this way, in subsequent step SP119 the hard disk drive 42 searches the data in the FAT area maintained in the memory 45 for detecting a cluster address having subsequent data recorded therein. Further, in subsequent step SP120 the hard disk drive 42 determines whether or not a code based on the thus detected address is an EOF.

When a negative result is obtained, the hard disk drive 42 moves to step SP114. Then, the AV system 41 repeats the procedure of the steps SP120-SP114-SP115-SP116-SP117-SP118-SP119-SP120 so as to successively detect consecutive cluster addresses according to a process on the hard disk drive 42 side, thereby reproducing a file designated by the host apparatus 47.

Figure 11:
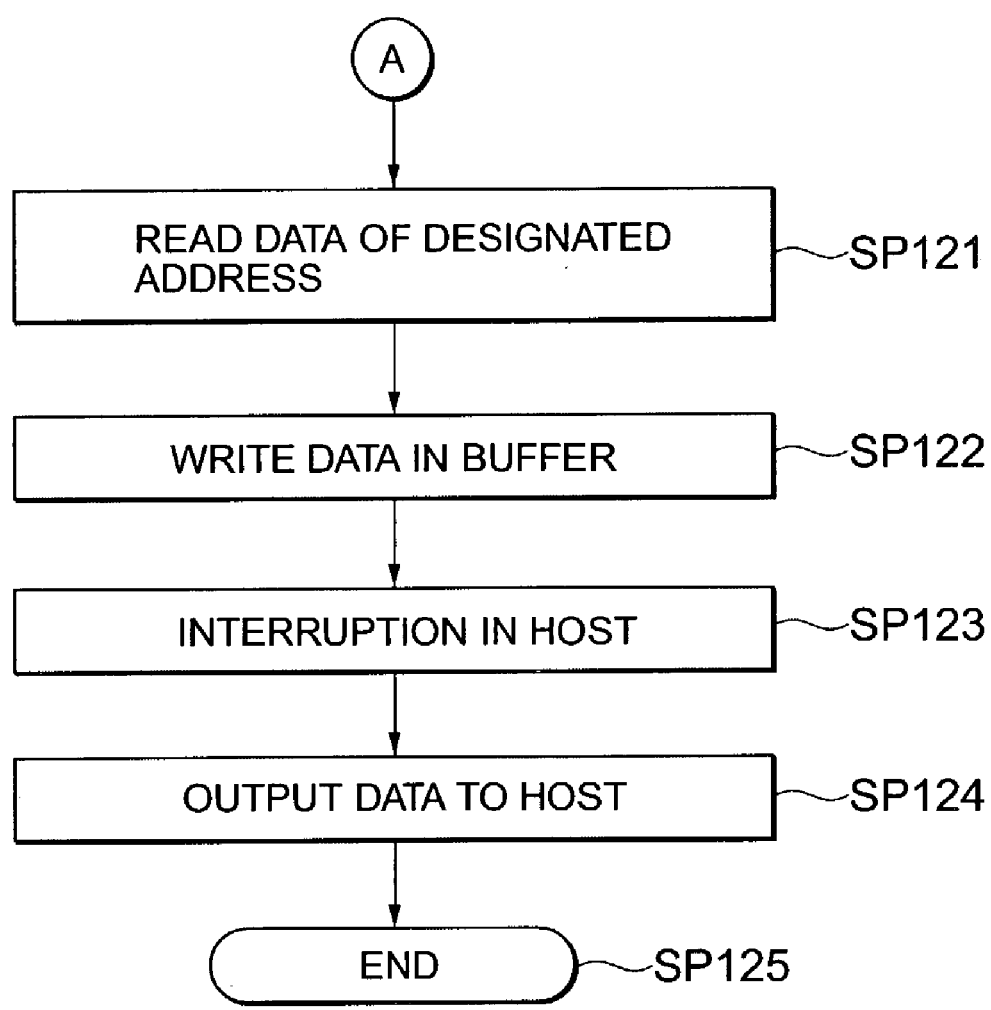
FIG. 11 is a flow chart following FIG. 10.

Upon reaching the EOF in this way, the AV system 41 moves from step SP120 to step SP121 (see FIG. 11) when a positive result is obtained in step SP120. The hard disk drive 42 reads data from the hard disk 3 according to the cluster addresses detected in step SP119. In subsequent step SP122, the read data are temporarily stored in the buffer memory 10. The host apparatus 47 is interrupted in subsequent step SP123. Because of the interruption, the host apparatus 47 moves to step SP124 and instructs the hard disk drive 42 to transfer the data. Due to the instructions, the hard disk drive 42 outputs the temporarily stored user data in the buffer memory 10 to the host apparatus 47, then moves to step SP125 so as to terminate the procedure.

On the other hand, for recording/reproducing a moving image file, as described above with respect to the first preferred embodiment of the present invention, the process with respect to the GOP table on the host apparatus 22 side may be executed on the hard disk drive 42 side so that a load on the host apparatus 47 is also considerably reduced.

Figure 12:
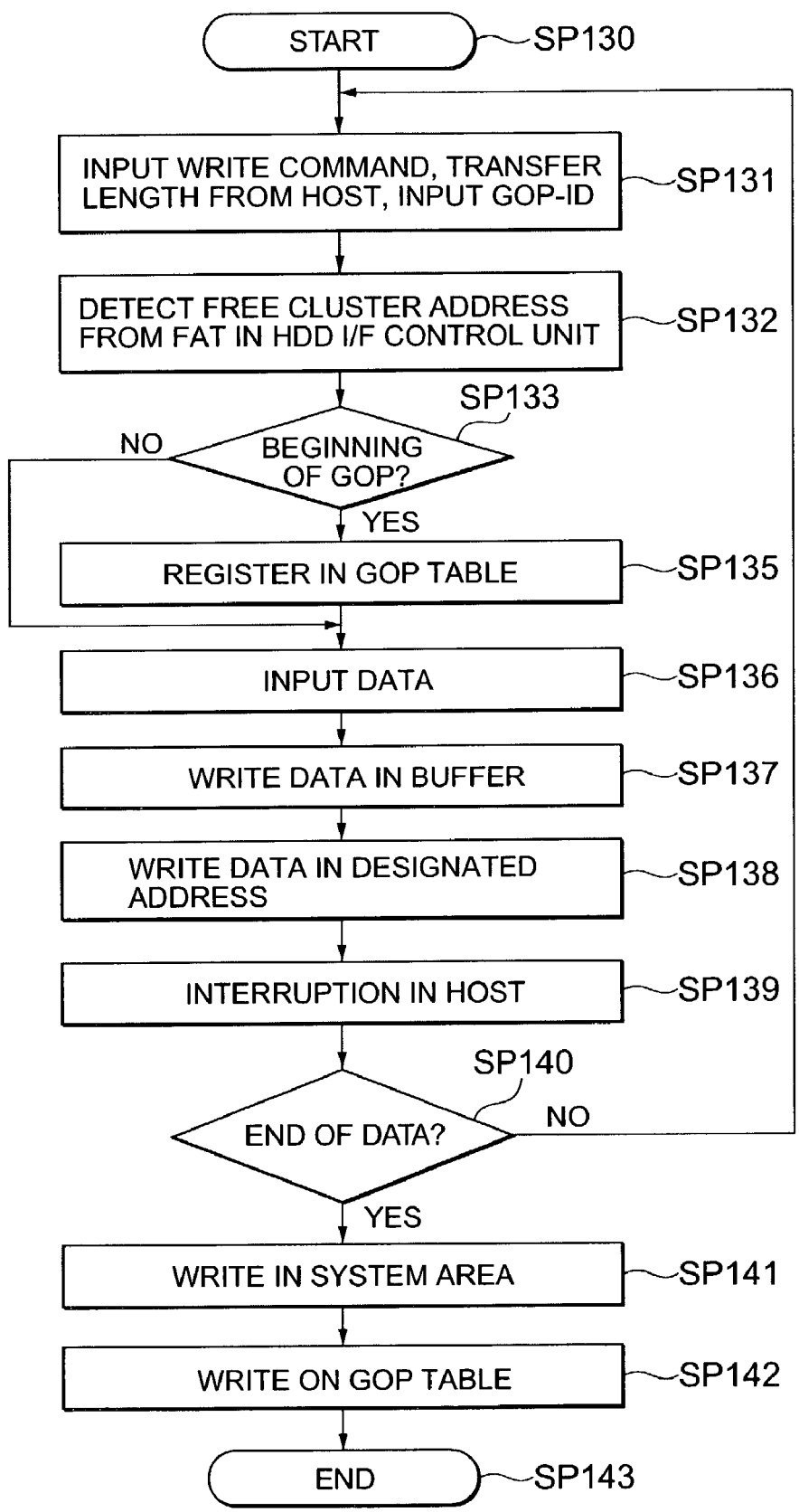
FIG. 12 is a flow chart showing a procedure when recording a moving image file in the AV system of FIG. 8.
Figure 13:
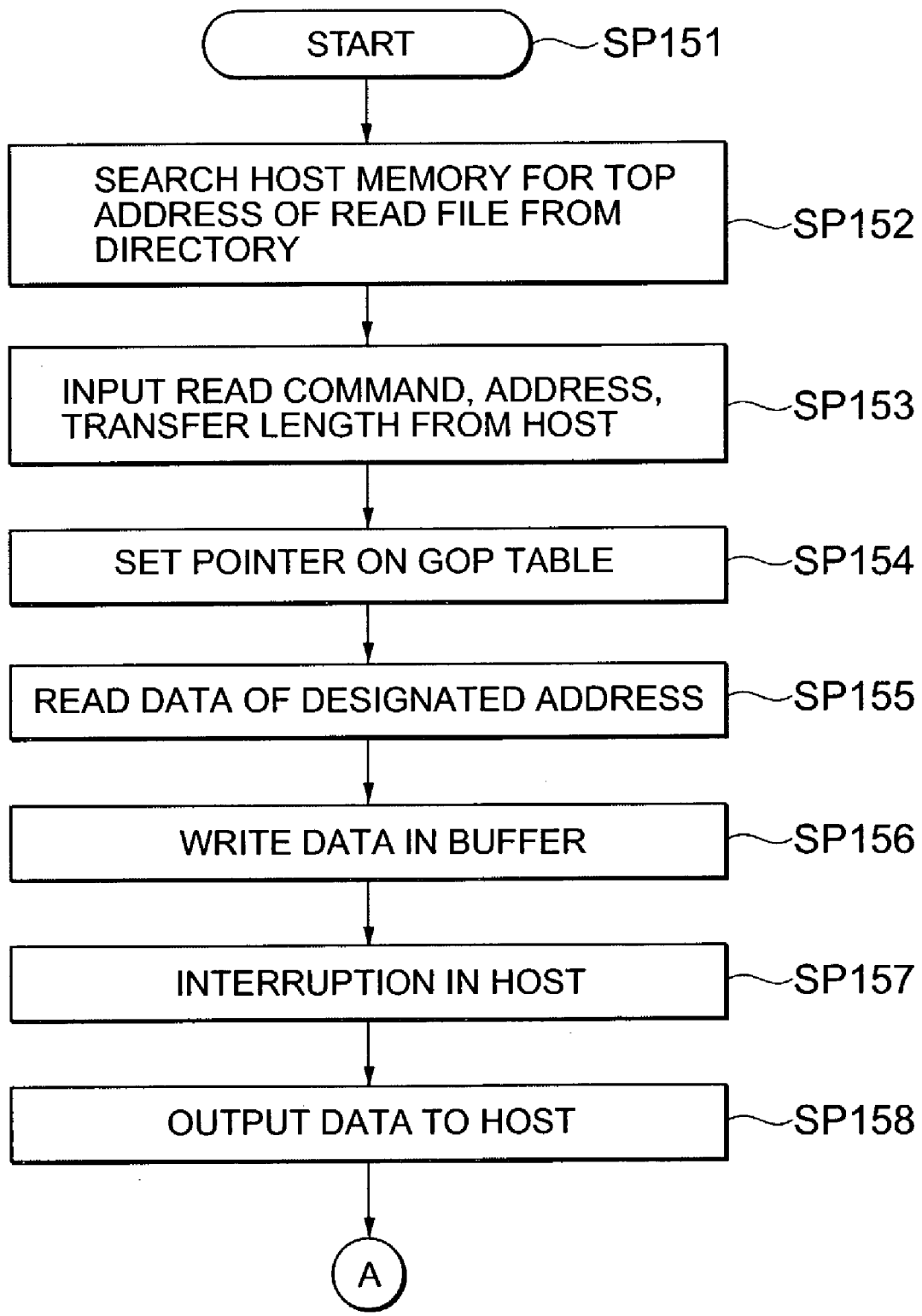
FIG. 13 is a flow chart showing a procedure when reproducing the moving image file in the AV system of FIG. 8.
Figure 14:
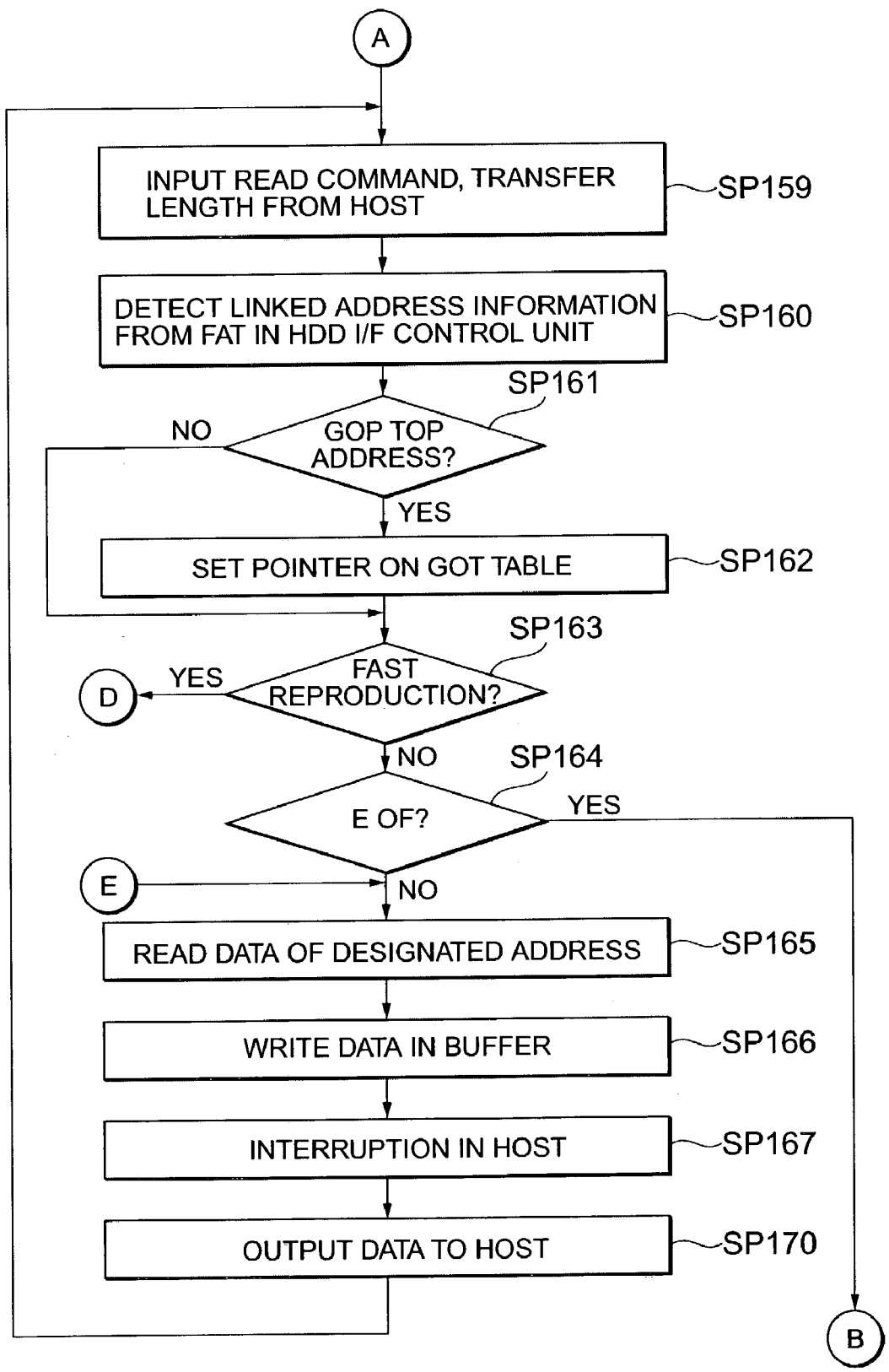
FIG. 14 is a flow chart following FIG. 13.
Figure 15:
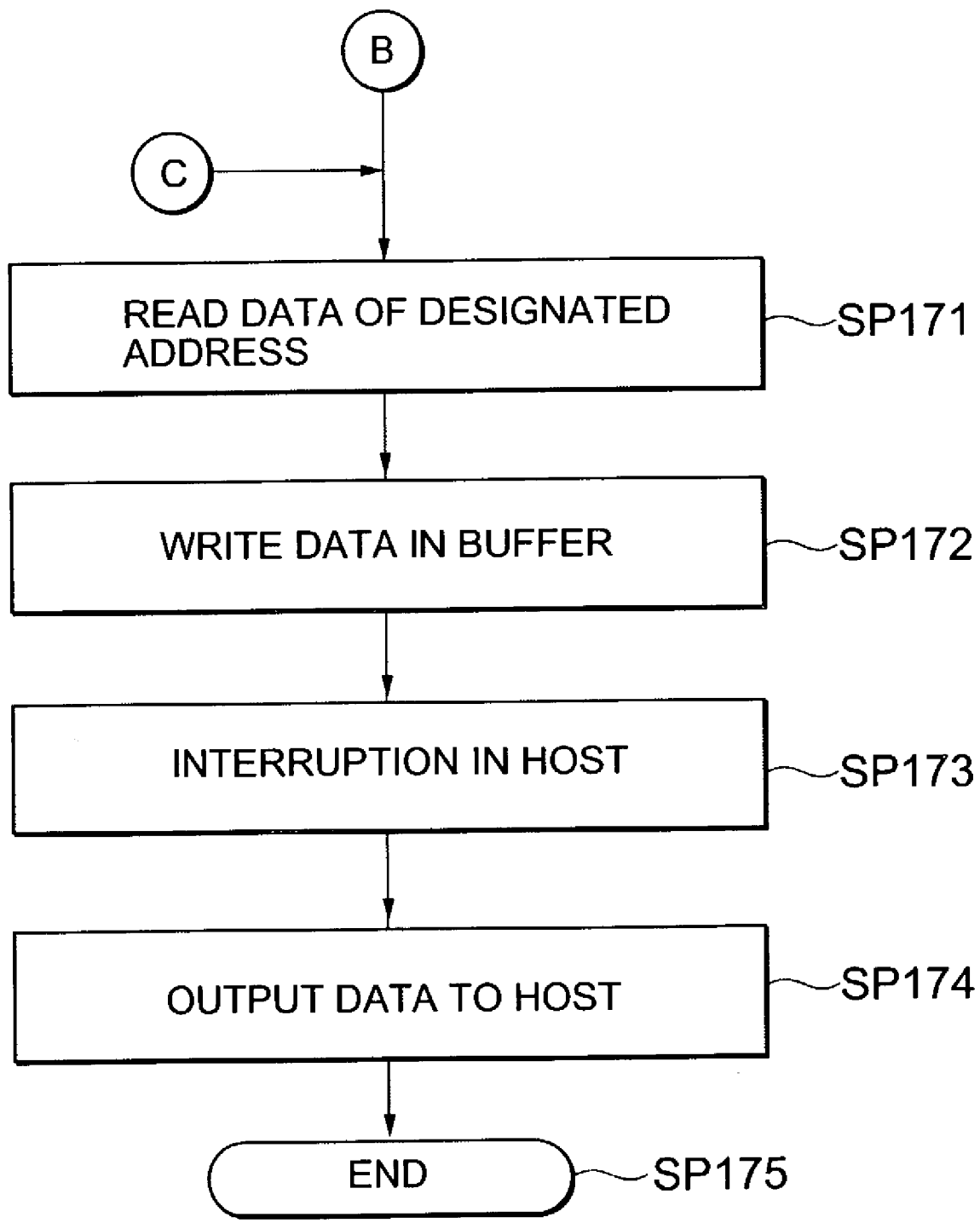
FIG. 15 is a flow chart following FIG. 14.

FIG. 12 is a flow chart showing a writing process of the moving image file in the AV system 41. In the AV system 41, the procedure is executed when recording the video data based on the MPEG standard. In other words, starting with the procedure, the AV system 41 moves from step SP130 to step SP131, where the host apparatus 47 sets a parameter based on the transfer length and issues a write command. Then, according to the notice from the encoder or by monitoring the control codes, the host apparatus 47 puts a GOP-ID which is an identification code for I-pictures, P-pictures and B-pictures into the parameter with respect to the data to be recorded and issues a command.

According the command, in subsequent step SP132 the hard disk drive 42 searches the data of the FAT area recorded in the memory 45 for detecting free cluster addresses. Then, the hard disk drive 42 moves to step SP133, checks the GOP-ID, determines whether or not it is a head of the GOP. When a positive result is obtained, the hard disk drive 42 moves to step SP135, and records corresponding cluster address in the memory 45 to thereby input the cluster address of an I-picture into the GOP table and moves to step SP136. On the other hand, when a negative result is obtained in step SP133, the process moves directly from step SP133 to step SP136.

In subsequent step SP136, the AV system 41 obtains data to be recorded which are outputted from the host apparatus 47, then in subsequent step SP137 the obtained data are recorded in the buffer memory 10, further in subsequent step SP138 the data recorded in the buffer memory 10 are successively recorded in the free clusters detected in step SP132.

Upon completion of recording the data transmitted from the host apparatus 47 in this way, the hard disk drive 42 interrupts the host apparatus 47 in step SP139. Because of the interruption, the host apparatus 47 moves to step SP140 so as to determine whether or not transferring the data provided for recording has been completed, and returns to step SP131, if a negative result is obtained. Thus, the AV system 41 may detect free clusters on the hard disk drive 42 side and record moving image file data outputted from the host apparatus 42 onto the hard disk 3, while inputting a cluster address into the GOP table for each I-picture.

On the other hand, upon completion of transferring the data provided for recording, a positive result is obtained in step SP140. Then, the host apparatus 47 moves to step SP141, updates contents in the directory area recorded in the host memory 48 so as to correspond to the records in the file, and further, in the hard disk drive 42, updates the system entry area in the hard disk 3 in order to correspond to the records in the directory area and the FAT maintained in the memory 45.

In addition, in subsequent step SP142, with respect to the GOP table having cluster codes successively inputted therein, a file based on the data in the GOP table is recorded in the hard disk 3, then moves to step SP143 so as to terminate the procedure. As a result, in this preferred embodiment of the present invention, a series of moving image record processes are executed by managing the GOP table on the hard disk drive 42 side.

On the other hand, FIG. 13 to FIG. 16 are flow charts showing procedures when the thus recorded video file is reproduced forward. The AV system 41 executes the procedure with respect to the video file based on the MPEG standard. In other words, when starting the procedure, the AV system 41 moves from step SP151 to step SP152 and causes the central processing unit 49 to search the directory area in the system memory 48 so as to detect a top cluster number of the objective file.

Upon detection of the top cluster number, in step SP153 the central processing unit 49 sets a parameter based on the top cluster address, a transfer length, a reproduction direction and a reproduction speed so as to issue a read command. When the host apparatus 47 issues the read command in this way, in subsequent step SP154 the hard disk drive 42 sets a pointer at a location of corresponding cluster address of the GOP table recorded in the memory 45.

Then, hard disk drive 42 reads the data designated by the command from the hard disk 3. In subsequent step SP156, the read data are temporarily stored in the buffer memory 10. Upon completion of the reading, the host apparatus 47 is interrupted in subsequent step SP157. Because of the interruption, the central processing unit 49 of the host apparatus 47 moves to step SP158 and instructs the hard disk drive 42 to transfer the data. Due to the instructions, in the hard disk drive 42, the temporarily recorded user data in the buffer memory 10 are outputted to the host apparatus 47.

When inputting the user data corresponding to one read command in this way, then in subsequent step SP159 (see FIG. 14), the host apparatus 47 sets a parameter based on the reproduction speed, the reproduction direction, and the transfer length, and issues a read command. According to the read command, in subsequent step SP160 the hard disk drive 42 detects a subsequent cluster address from the records in the FAT recorded in the memory 45.

In subsequent step SP161, the hard disk drive 42 searches the GOP table according to the cluster address detected in step SP160, then determines whether or not a subsequent cluster is a top of the GOP. When a positive result is obtained, the hard disk drive 42 sets a pointer at a location of corresponding cluster address of the GOP table, then moves to step SP163. On the other hand, when a negative result is obtained in step SP161, the hard disk drive 42 moves directly from step SP161 to step SP163.

In step SP163 the hard disk drive 42 determines whether or not the reproduction speed designated by the host apparatus 47 is faster reproduction than a predetermined reproduction speed. When a negative result is obtained, the hard disk drive 42 determines whether or not the code of the cluster address detected in step SP160 is EOF. When a negative result is obtained, the hard disk drive 42 moves to step SP165 and reads the data from the hard disk 3 according to the cluster address detected in step SP160. In subsequent step SP166, the read data are temporarily stored in the buffer memory 10. Upon completion of the reading, the host apparatus 47 is interrupted in subsequent step SP167. Because of the interruption, the host apparatus 47 moves to step SP170 and instructs the hard disk drive 42 to transfer the data. Due to the instructions, the hard disk drive 42 outputs the temporarily recorded user data in the buffer memory 10 to the host apparatus 47, then returns to step SP159.

On the other hand, when a positive result is obtained in step SP164, the hard disk drive 42 moves from step SP164 to step SP171 (see FIG. 15) and reads the data from the hard disk 3 according to the cluster address detected in step SP160. In subsequent step SP172, the read data are temporarily stored in the buffer memory 10. Upon completion of the reading, the host apparatus 47 is interrupted in subsequent step SP173. Because of the interruption, the host apparatus 47 moves to step SP174 and instructs the hard disk drive 42 to transfer the data. Due to the instructions, the hard disk drive 42 outputs the temporarily recorded user data in the buffer memory 10 to the host apparatus 47, then returns to step SP175 so as to terminate the procedure.

As a result, in the AV system 41, when the reproduction speed is not a high speed, the moving image files recorded on the hard disk 3 are successively reproduced so as to be outputted to the host apparatus 47 according to the file management by means of the FAT on the hard disk drive 42 side.

Figure 16:
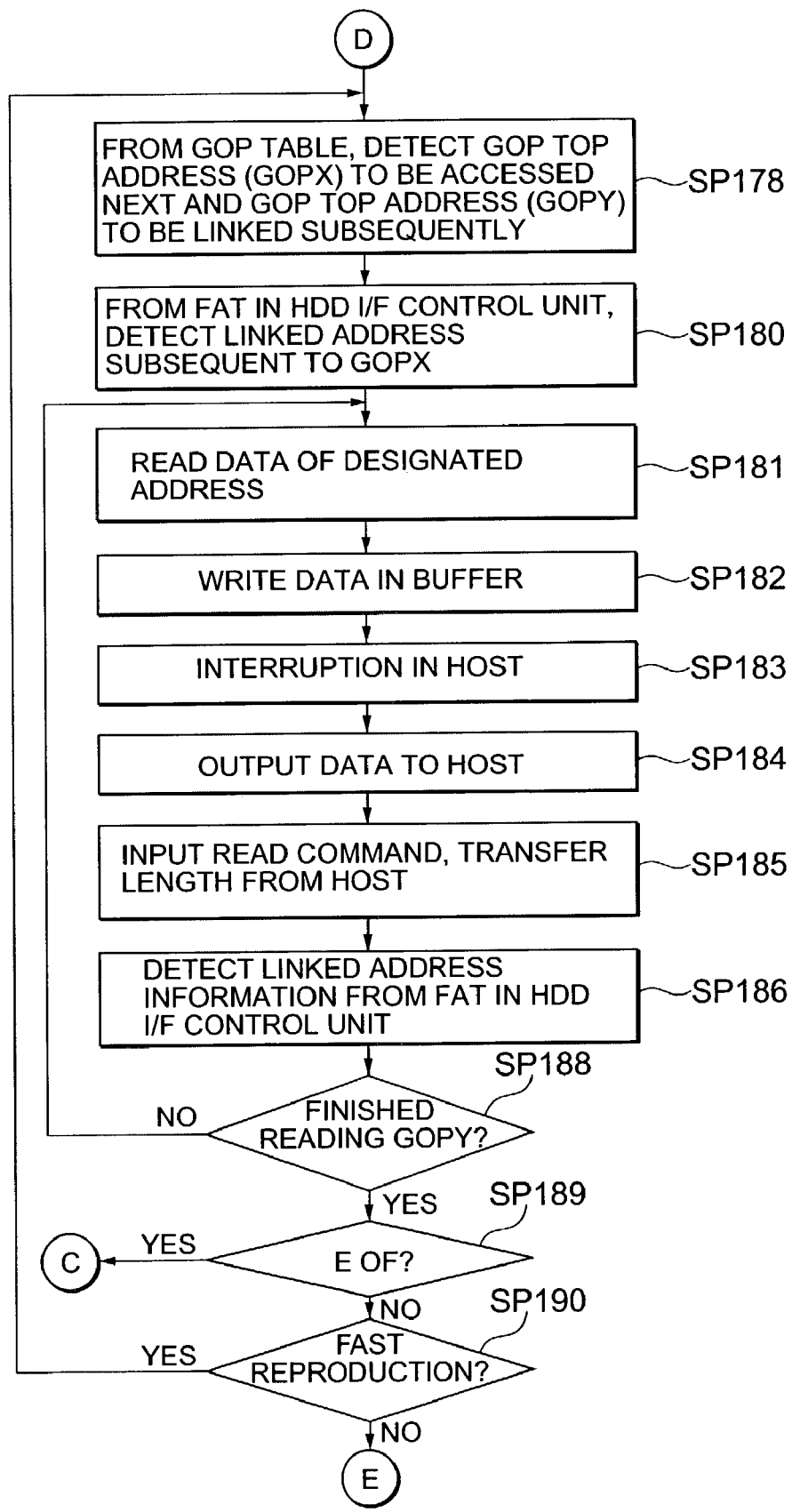
FIG. 16 is a flow chart following FIG. 14 in the case of fast reproduction.

On the other hand, when the reproduction speed is a high speed, due to the positive result obtained in step SP163, hard disk drive 42 moves from step SP163 to step SP178 (see FIG. 16). In step SP178, according to the reproduction speed designated by the host apparatus 47, hard disk drive 42 detects a top address of the GOP to be accessed next and a top address of the following GOP, whereby the hard disk drive 42 may detect a GOP to be reproduced.

Then, in step SP180 hard disk drive 42 searches the FAT recorded in the memory 45 for detecting a cluster address to be subsequently reproduced with respect to the GOP detected in step SP178. Further, in step SP181, according to the detected cluster address, the hard disk drive 42 reproduces video data from the hard disk 3. In subsequent step SP182, the read data are temporarily stored in the buffer memory 10. Upon completion of the reading, the host apparatus 47 is interrupted in subsequent step SP183. Because of the interruption, the host apparatus 47 moves to step SP184 and instructs the hard disk drive 42 to transfer the data. Due to the instructions, in the hard disk drive 42, the temporarily recorded user data in the buffer memory 10 are outputted to the host apparatus 47.

Upon receiving the data in this way, in subsequent step SP185 the host apparatus 47 sets a parameter based on the transfer length, the reproduction direction and the reproduction speed so as to output a read command. According the command, in subsequent step SP186 the hard disk drive 42 searches the FAT recorded in the memory 45 for detecting a cluster address to be subsequently reproduced with respect to the GOP detected in step SP178. Further, in step SP188, according to the cluster address, hard disk drive 42 determines whether or not the cluster is the cluster address with respect to the pointer GOPY detected in step SP180 so as to determine whether or not the data have been reproduced by one GOP. When a negative result is obtained, the process returns from step SP188 to step SP181.

As a result, the AV system 41 repeats the procedure of the steps SP181-SP182-SP183-SP184-SP185-SP186-SP188-SP181. After completing the reproduction of the one GOP of data (the GOP detected in step SP180), the AV system 41 moves to step SP189 since a positive result is obtained in step SP188. In the step, the hard disk drive 42 determines whether or not the code of the cluster address detected in step SP186 is EOF. When a positive result is obtained, the central processing unit 24 moves from step SP189 to step SP171, executes a series of procedures, outputs the rest of the data to the host apparatus 47, then terminates the procedures.

On the other hand, when a negative result is obtained in step SP189, the hard disk drive 42 moves from step SP189 to step SP190 and determines whether or not the reproduction speed is a high speed. When a positive result is obtained in the step, the hard disk drive 42 moves to step SP178 and repeats a process with respect to a subsequent GOP. On the other hand, when a negative result is obtained, the hard disk drive 42 moves from step SP190 to step SP165.

As a result, in this preferred embodiment of the present invention, for a fast forward reproduction, by executing the procedure, the moving image file may be reproduced by the unit of GOP according to the management by means of the GOP table on the hard disk drive 42 side, whereby a process of special reproduction with respect to a forward reproduction may be executed.

For reverse reproduction, according to the management by means of the GOP table on the hard disk drive 42 side, cluster addresses are detected in the reverse order to that described in FIG. 13 to FIG. 16 so as to reproduce and decode video data successively from the hard disk drive 3 by units of GOP, whereby resulting that pictures are rearranged and selectively outputted so as to output similar reproduction results.

According to the construction of the second preferred embodiment of the present invention, by means of the management on the hard disk drive side, the moving image file management table is formed so as to specify a limit of a unit of encoding and to utilize the moving image file management table for reproducing moving image files, thereby obtaining an effect similar to that in the first preferred embodiment of the present invention. Further, because of the management on the hard disk drive side, a load on the host apparatus may be reduced.

In other words, the management table and the moving image file management table are maintained in the built-in memory, the file management data are outputted to the host apparatus, and the reproduction processes of the moving image files may be executed according to the instructions from the host apparatus based on the file management data, whereby the load on the host apparatus may be considerably reduced.

(3) Third Preferred Embodiment of the Present Invention

Figure 17:
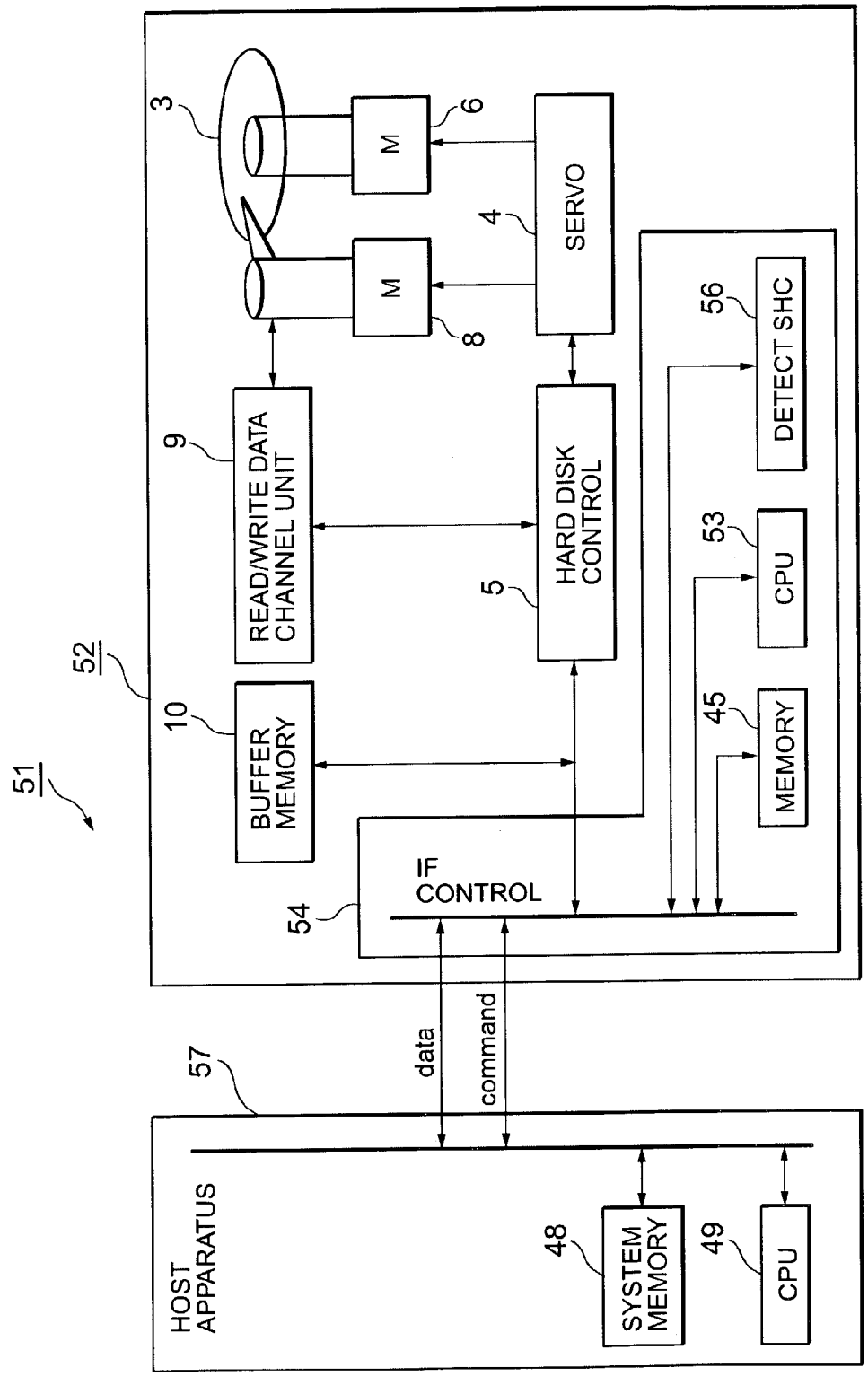
FIG. 17 is a block diagram showing an AV system with respect to the third embodiment according to the present invention.

FIG. 17 is a block diagram showing an AV system with respect to a third preferred embodiment of the present invention. In the AV system 51, an SHC detection circuit 56 is disposed at an interface control circuit 54. The SHC detection circuit 56 monitors a control code so as to detect a top of a GOP, whereby a notice of a picture with respect to the GOP-ID may be omitted in a host apparatus 57. Further, in the hard disk drive 52, a process for detecting an I-picture with respect to the GOP-ID may be omitted.

The AV system 51 has the same construction as that of the second preferred embodiment of the present invention, except that a top of the GOP is detected by the SHC detection circuit 56. The SHC detection circuit 56 monitors the control code so as to detect an SHC, thereby detecting the top of the GOP. The SHC is "00 00 01 B3 h".

Figure 18:
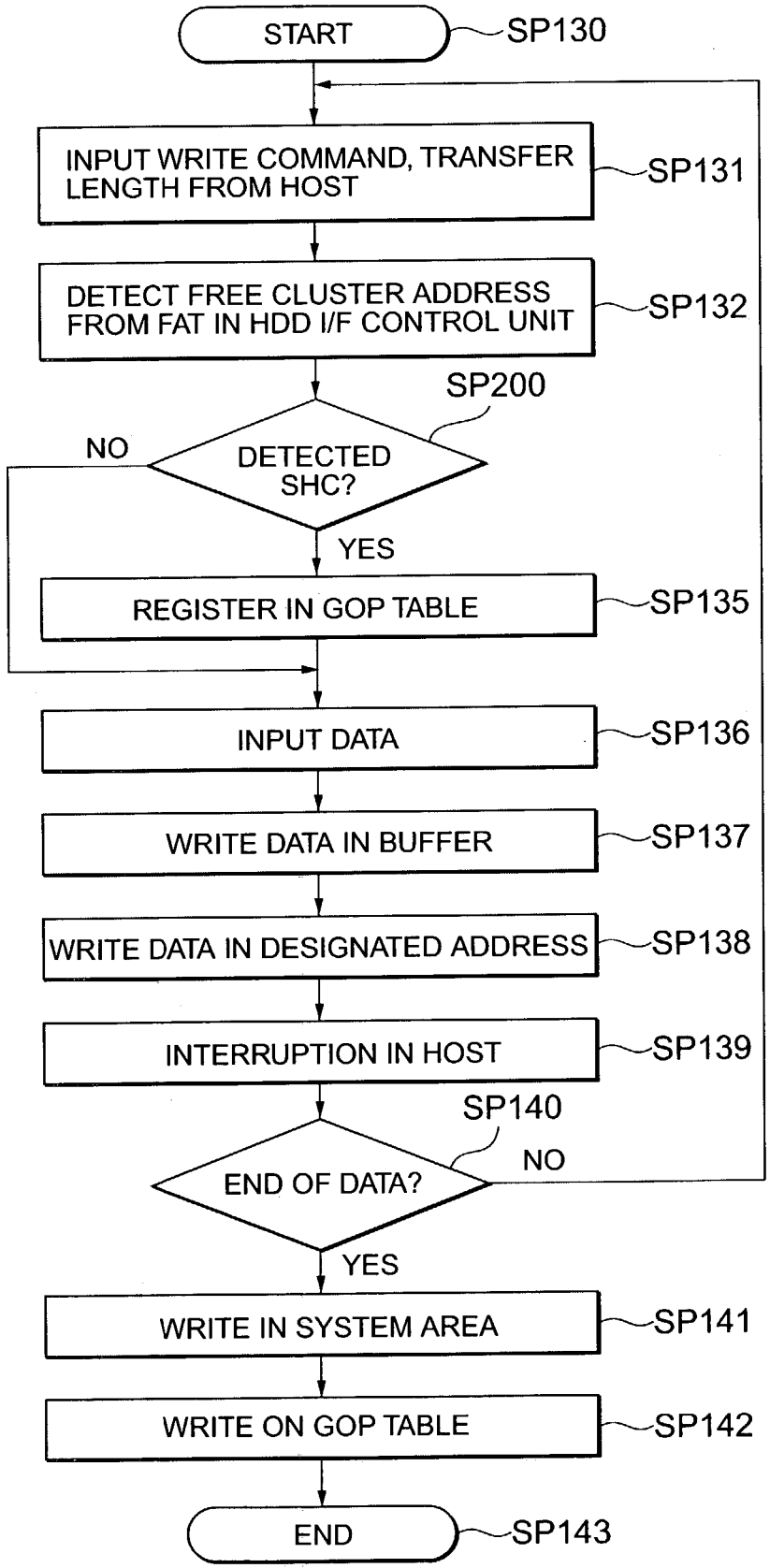
FIG. 18 is a flow chart showing a procedure when recording a moving image file in the AV system of FIG. 17.

Accordingly, FIG. 18 shows a flowchart showing a write procedure in the AV system 51. Instead of detecting the top of the GOP by means of GOP-ID (see FIG. 12, step SP133), the procedure is executed in the same way as the write procedure in the AV system according to the second preferred embodiment of the present invention, except that the top of the GOP is detected by the SHC detection circuit 56 (step SP200). With respect to FIG. 18, the same processes as those in FIG. 12 are indicated by corresponding reference numerals or signs, and redundant description is omitted.

According to the construction of the third preferred embodiment of the present invention, a top or head of a unit of encoding may be detected by a dedicated circuit on the hard disk drive side and a notice of picture type from the host apparatus corresponding to the detection may be omitted, thereby further simplifying the construction of the host apparatus.

(4) Other Preferred Embodiment of the Present Inventions

In the above preferred embodiment of the present inventions, it is described that all the GOP tables are loaded together when loading the data of the system entry and the moving image files and the GOP tables are respectively linked by comparing with the file management data, however, the present invention is not limited thereto. For example, the moving image files and the GOP tables may be each linked by recording information for specifying the GOP tables corresponding to a part of the file management data.

In the above mentioned preferred embodiments of the present invention, it is described that the GOP table is prepared for each moving image file, however, the present invention is not limited thereto. A GOP table may be prepared for a group of a plurality of moving image files.

Also, in the above mentioned preferred embodiments of the present invention, it is described that the GOP table is recorded in the recording medium for the moving image files, however, the present invention is not limited thereto. The table may be recorded and maintained in the memory built in the hard disk drive.

In addition, in the above preferred embodiments of the present invention, it is described that the moving image file based on the MPEG data standard which is a variable length encoding system is recorded/reproduced, however, the present invention is not limited thereto. The present invention may be widely applied to a system recording/reproducing a variety of moving image files such as a moving image file based on the DV standard which is a fixed length encoding system.

Furthermore, in the above mentioned preferred embodiments of the present invention, it is described that a variety of files are recorded on the hard disk, however, the present invention is not limited thereto. The present invention may be widely applied to recording different files in different recording media such as an optical disk, a solid-state memory apparatuss, for example.

Moreover, in the above mentioned preferred embodiments of the present invention, it is described that the series of processes are executed by means of processing programs pre-installed in the host apparatus and hard disk drive, however, the present invention is not limited thereto. The present invention may be widely applied to the case of executing such procedures by installing the programs downloaded via a network such as the Internet, the case of executing a procedure by installing programs provided by a variety of recording media, for example. Recording media such as a magnetic disk, an optical disk, magnetic tape, etc. may be employed as the recording media.

Accordingly, it should be pointed out that the preferred embodiments of the present invention as mentioned above are just examples of realization of the present invention. Therefore, the present invention will not be limited to the above-mentioned preferred embodiments of the present invention. Thus, it should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus for management of a data area of a recording medium, said apparatus comprising:
   reproduction means for reproducing a moving image file recorded in said data area by referring to a moving image file management table,
      wherein said moving image file management table comprises a table having recorded thereon an address of said management unit for permitting specifying a limit of an encoding process unit of said moving image file among files recorded in said data area, and
      wherein said reproduction means includes pointers successively set in correspondence to said moving image file management table in which video data is reproduced from a hard disk via cluster addresses detected based on said pointers and subsequently decoded at time intervals according to reproduction speed.

2. The information processing apparatus according to claim 1 wherein said address recorded in said moving image file management table comprises an address having recorded thereon an I picture according to an MPEG standard.

3. The information processing apparatus according to claim 1 wherein said encoding process unit comprises a GOP according to the MPEG standard.

4. The information processing apparatus according to claim 1 further comprising:
   recording means for recording said data file into said data area upon sequentially recording continuous data by units of said management unit; and
   updating means for updating said management table while recording said file management data so as to correspond to recording of said file by said recording means.

5. The information processing apparatus according to claim 4, wherein said producing means produces said moving image file management table based on a control code of a data string constituting said moving image file.

6. The information processing apparatus according to claim 1, wherein said reproduction means further comprises:
   decoding means for decoding an amount of one of said encoding process unit of said moving image file from said recording medium, based on said moving image file management table; and
   output means for outputting a picture resulting from a process by said decoding means.

7. The information processing apparatus according to claim 1, wherein said reproduction means further comprises:
   decoding means for decoding an amount of one of said encoding process unit of said moving image file from said recording medium, based on said moving image file management table; and
   arranging means for rearranging a picture resulting from a process by said decoding means.

8. The information processing apparatus according to claim 1 further comprising:
   acquisition means for acquiring and holding in memory said file management data, said management table and said moving image file management table, from a device for holding said recording medium; and
   reproduction means for executing reproduction process of said moving image file upon outputting a command to said apparatus, based on said record of said memory.

9. The information processing apparatus according to claim 8 further comprising:
   updating means for updating said record in said memory in accordance with recording of said moving image file by said device; and
   designation means for designating update of said file management data, said management table and said moving image file management table to said device in accordance with said updating of said memory performed by said updating means.

10. The information processing apparatus according to claim 8, further comprising:
    output means for outputting said file management data to a host apparatus along with holding said management table and said moving image file management table in memory; and
    reproducing means for executing a reproduction process of said moving image upon a command from said host apparatus based on said file management data.

11. The information processing apparatus according to claim 10 further comprising:
    recording means for recording and holding said file management data, said management table and said moving image file management table into said recording medium; and
    reproduction means for reproducing from said recording medium and holding in said memory said management table and said moving image file management table and outputting said file management data to said host apparatus.

12. A method of controlling an information processing apparatus for management of a data area of a recording medium, wherein said method comprises the step of:
    processing a moving image file by reproducing said moving image file recorded in said data area upon referring to a moving image file management table having recorded thereon an address of said management unit in order to permitting specifying a limit of an encoding process unit of said moving image file among files recorded in said data area,
       wherein said reproducing includes pointers successively set in correspondence to said moving image file management table in which video data is reproduced from a hard disk via cluster addresses detected based on said pointers and subsequently decoded at time intervals according to reproduction speed.

13. The method according to claim 12 wherein said address recorded in said moving image file management table comprises an address having recorded thereon an I picture according to an MPEG standard.

14. The method according to claim 12 wherein said encoding process unit comprises a GOP according to the MPEG standard.

15. The method according to claim 12, further comprising the steps of:
recording said data file into said data area upon sequentially recording continuous data by units of said management unit; and
updating said management table while recording said file management data so as to correspond to recording of said file.

16. The method according to claim 15, wherein said step of producing said moving image file management table further comprises producing said moving image management table based on a control code of a data string constituting said moving image file.

17. The method according to claim 12, wherein said step of processing of moving image file further comprises the steps of:
reproducing and decoding an amount of one of said encoding process unit of said moving image file from said recording medium, based on said moving image file management table; and
outputting a picture resulting from said decoding step.

18. The method according to claim 12, wherein said step of processing of moving image file further comprises the steps of:
reproducing and decoding an amount of one of said encoding process unit of said moving image file from said recording medium, based on said moving image file management table; and
rearranging a picture resulting from said decoding step.

19. The method according to claim 12, further comprising the steps of:
acquiring and holding in memory said file management data, said management table and said moving image file management table, from a device for holding said recording medium; and
executing said step of reproduction of said moving image file upon outputting a command to said device, based on a record of said memory.

20. The method according to claim 12, further comprising the steps of:
outputting said file management data to a host apparatus along with holding said management table and said moving image file management table in memory; and
executing said step of processing moving image, upon a command from said host apparatus based on said file management data.

21. A computer program stored on a computer-readable medium for controlling operation of an information processing apparatus for management of a data area of a recording medium, wherein said program comprises the step of:
processing a moving image file by reproducing said moving image file recorded in said data area upon referring to a moving image file management table having recorded thereon an address of said management unit in order to permitting specifying a limit of an encoding process unit of said moving image file among files recorded in said data area,
wherein said reproducing includes pointers successively set in correspondence to said moving image file management table in which video data is reproduced from a hard disk via cluster addresses detected based on said pointers and subsequently decoded at time intervals according to reproduction speed.

22. The controlling program according to claim 21 wherein said address recorded in said moving image file management table comprises an address having recorded thereon an I picture according to an MPEG standard.

23. The controlling program according to claim 21 wherein said encoding process unit comprises a GOP according to the MPEG standard.

24. The controlling program according to claim 21, further comprising the steps of:
recording said data file into said data area upon sequentially recording continuous data by units of said management unit; and
updating said management table while recording said file management data so as to correspond to recording of said file.

25. The controlling program according to claim 24, wherein said step of producing said moving image file management table further comprises producing said moving image management table based on a control code of a data string constituting said moving image file.

26. The controlling program according to claim 21, wherein said step of processing of moving image file further comprises the steps of:
reproducing and decoding an amount of one of said encoding process unit of said moving image file from said recording medium, based on said moving image file management table; and
outputting a picture resulting from said decoding step.

27. The controlling program according to claim 21, wherein said step of processing of moving image file further comprises the steps of:
reproducing and decoding an amount of one of said encoding process unit of said moving image file from said recording medium, based on said moving image file management table; and
rearranging a picture resulting from said decoding step.

28. The controlling program according to claim 21, further comprising the steps of:
acquiring and holding in memory said file management data, said management table and said moving image file management table, from a device for holding said recording medium; and
executing said step of reproduction of said moving image file upon outputting a command to said device, based on a record of said memory.

29. The controlling program according to claim 21, further comprising the steps of:
outputting said file management data to a host apparatus along with holding said management table and said moving image file management table in memory; and
executing said step of processing moving image, upon a command from said host apparatus based on said file management data.

30. A recoding medium containing a control program for controlling an information processing apparatus for management of a data area, wherein said control program comprises the step of:
processing a moving image file by reproducing said moving image file recorded in said data area upon referring to a moving image file management table having recorded thereon an address of said management unit in order to permitting specifying a limit of an encoding process unit of said moving image file among files recorded in said data area, wherein said reproducing includes pointers successively set in correspondence to said moving image file management table in which video data is reproduced from a hard disk via cluster addresses detected based on said pointers and subsequently decoded at time intervals according to reproduction speed.

31. The recording medium according to claim 30 wherein said address recorded in said moving image file management table comprises an address having recorded thereon an I picture according to an MPEG standard.

32. The recording medium according to claim 30 wherein said encoding process unit comprises a GOP according to the MPEG standard.

33. The recording medium according to claim 30, wherein said control program further comprises the steps of:

recording said data file into said data area upon sequentially recording continuous data by units of said management unit; and updating said management table while recording said file management data so as to correspond to recording of said file.

34. The recording medium according to claim 33, wherein said step of producing said moving image file management table further comprises producing said moving image management table based on a control code of a data string constituting said moving image file.

35. The recording medium according to claim 30, wherein said step of processing of moving image file further comprises the steps of:

reproducing and decoding an amount of one of said encoding process unit of said moving image file from said recording medium, based on said moving image file management table; and outputting a picture resulting from said decoding step.

36. The recording medium according to claim 30, wherein said step of processing of moving image file further comprises the steps of:

reproducing and decoding an amount of one of said encoding process unit of said moving image file from said recording medium, based on said moving image file management table; and rearranging a picture resulting from said decoding step.

* * * * *